(12) United States Patent
Williams

(10) Patent No.: US 10,643,244 B2
(45) Date of Patent: *May 5, 2020

(54) TAILORED CONTENT WITH TAILORED OPTIONS RELATED TO REMINDERS

(71) Applicant: American Express Travel Related Services Company, Inc., New York, NY (US)

(72) Inventor: Troy P. Williams, Holtsville, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 233 days.

This patent is subject to a terminal disclaimer.

(21) Appl. No.: 15/814,739

(22) Filed: Nov. 16, 2017

(65) Prior Publication Data

US 2018/0075489 A1   Mar. 15, 2018

Related U.S. Application Data

(63) Continuation of application No. 15/138,849, filed on Apr. 26, 2016, now Pat. No. 9,846,894, which is a
(Continued)

(51) Int. Cl.
*G06Q 30/00* (2012.01)
*G06Q 30/02* (2012.01)
(Continued)

(52) U.S. Cl.
CPC ..... *G06Q 30/0267* (2013.01); *G06F 16/9535* (2019.01); *G06F 16/9558* (2019.01);
(Continued)

(58) Field of Classification Search
CPC .......... G06Q 30/0267; G06Q 30/0625; G06Q 10/06316; G06Q 30/0242; G06Q 30/0255;
(Continued)

(56) References Cited

U.S. PATENT DOCUMENTS 5,696,965 A   12/1997  Dedrick
7,983,401 B1   7/2011  Krinsky
(Continued)

OTHER PUBLICATIONS

Notice of Allowance dated Nov. 27, 2017 in U.S. Appl. No. 13/489,295.
(Continued)

*Primary Examiner* — Jason B Dunham
*Assistant Examiner* — Anand R Loharikar
(74) *Attorney, Agent, or Firm* — Thomas Horstemeyer, LLP

(57) ABSTRACT

The present disclosure identifies and/or delivers tailored content based upon a service dialog. For example, the systems may receive a request for tailored content, facilitate a service dialog to obtain information related to the request, and communicate a plurality of tailored content based upon the information related to the request. Further, the systems may identify tailored content based upon a consumer profile, communicate the tailored content to a web client, and/or receive a selection of the tailored content. Further still, the systems may modify a magazine (e.g., content that is presented electronically) based upon tailored content.

19 Claims, 14 Drawing Sheets

Related U.S. Application Data continuation of application No. 14/966,715, filed on Dec. 11, 2015, now Pat. No. 9,349,137, which is a continuation of application No. 14/319,438, filed on Jun. 30, 2014, now Pat. No. 9,245,250, which is a continuation of application No. 13/827,935, filed on Mar. 14, 2013, now Pat. No. 9,355,378.

(51) Int. Cl.

| | | |
|---|---|---|
| *G06Q 30/06* | (2012.01) | |
| *G06F 16/9535* | (2019.01) | |
| *G06F 16/955* | (2019.01) | |
| *G06Q 10/06* | (2012.01) | |
| *G06Q 50/00* | (2012.01) | |
| *G06Q 20/10* | (2012.01) | |
| *H04L 29/08* | (2006.01) | |
| *G06Q 20/32* | (2012.01) | |
| *H04W 4/14* | (2009.01) | |
| *G06Q 20/12* | (2012.01) | |

(52) U.S. Cl.
CPC ... *G06F 16/9566* (2019.01); *G06Q 10/06316* (2013.01); *G06Q 20/10* (2013.01); *G06Q 20/325* (2013.01); *G06Q 30/0242* (2013.01); *G06Q 30/0251* (2013.01); *G06Q 30/0255* (2013.01); *G06Q 30/0257* (2013.01); *G06Q 30/0269* (2013.01); *G06Q 30/0277* (2013.01); *G06Q 30/0621* (2013.01); *G06Q 30/0625* (2013.01); *G06Q 30/0631* (2013.01); *G06Q 30/0641* (2013.01); *G06Q 50/01* (2013.01); *H04L 67/02* (2013.01); *H04L 67/16* (2013.01); *H04L 67/22* (2013.01); *H04W 4/14* (2013.01); *G06Q 20/123* (2013.01)

(58) Field of Classification Search
CPC .............. G06Q 50/01; G06Q 30/0251; G06Q 30/0621; G06Q 20/10; G06Q 30/0631; G06Q 30/0269; G06Q 30/0277; G06Q 30/0641; G06Q 20/325; G06Q 30/0257; G06Q 20/123; G06F 16/9535; G06F 16/9558; G06F 16/9566; H04L 67/02; H04L 67/16; H04L 67/22; H04W 4/14

See application file for complete search history.

(56) References Cited

U.S. PATENT DOCUMENTS

| | | |
|---|---|---|
| 2005/0240488 A1 | 10/2005 | Grendel et al. |
| 2007/0032247 A1 | 2/2007 | Shaffer et al. |
| 2007/0088624 A1 | 4/2007 | Vaughn et al. |
| 2007/0088713 A1 | 4/2007 | Baxter et al. |
| 2007/0239535 A1 | 10/2007 | Koran et al. |
| 2008/0189360 A1 | 8/2008 | Kiley et al. |
| 2009/0132364 A1 | 5/2009 | Agarwal |
| 2009/0292584 A1 | 11/2009 | Dalal et al. |
| 2010/0161432 A1 | 6/2010 | Kumanov et al. |
| 2010/0262499 A1 | 10/2010 | Karlsson et al. |
| 2011/0202404 A1 | 8/2011 | van der Riet |
| 2011/0295671 A1 | 12/2011 | Thomas et al. |
| 2012/0011033 A1 | 1/2012 | Salgia |
| 2012/0047012 A1 | 2/2012 | Pedersen et al. |
| 2012/0208461 A1 | 8/2012 | Choi et al. |
| 2012/0221418 A1 | 8/2012 | Smith |
| 2012/0246003 A1 | 9/2012 | Hart et al. |
| 2012/0246007 A1 | 9/2012 | Williams et al. |
| 2012/0323805 A1 | 12/2012 | Udani |
| 2013/0024262 A1* | 1/2013 | Libenson ............... G06Q 30/02 705/14.25 |
| 2013/0030919 A1* | 1/2013 | Brinson, Jr. ....... G06Q 30/0251 705/14.58 |
| 2013/0072116 A1 | 3/2013 | Song et al. |
| 2013/0166406 A1 | 6/2013 | Yardley et al. |
| 2013/0166580 A1 | 6/2013 | Maharajh et al. |
| 2013/0173390 A1 | 7/2013 | Polo |
| 2013/0179268 A1* | 7/2013 | Hu ..................... G06Q 30/0207 705/14.66 |
| 2013/0218713 A1 | 8/2013 | Gottfurcht et al. |
| 2013/0225595 A1 | 8/2013 | Gillies et al. |
| 2013/0297416 A1 | 11/2013 | Dipaola et al. |
| 2013/0311337 A1 | 11/2013 | Stoll et al. |
| 2013/0325547 A1 | 12/2013 | Clark |
| 2013/0332355 A1 | 12/2013 | Atsmon et al. |
| 2014/0040028 A1 | 2/2014 | King et al. |
| 2014/0074612 A1 | 3/2014 | Mahadevan et al. |
| 2014/0114706 A1 | 4/2014 | Blakely |
| 2014/0122211 A1 | 5/2014 | Diab et al. |

OTHER PUBLICATIONS

Notice of Allowance dated Dec. 4, 2017 in U.S. Appl. No. 13/489,320.
Office Action dated Jun. 21, 2013 in U.S. Appl. No. 13/488,197.
Office Action dated Jul. 5, 2013 in U.S. Appl. No. 13/488,285.
Final Office Action dated Nov. 21, 2013 in U.S. Appl. No. 13/488,197.
Final Office Action dated Jan. 29, 2014 in U.S. Appl. No. 13/488,285.
Office Action dated Feb. 14, 2014 in U.S. Appl. No. 13/827,935.
Advisory Action dated Feb. 21, 2014 in U.S. Appl. No. 13/488,285.
Office Action dated Feb. 28, 2014 in U.S. Appl. No. 13/489,295.
Office Action dated Mar. 20, 2014 in U.S. Appl. No. 13/489,274.
Office Action dated Mar. 26, 2014 in U.S. Appl. No. 13/489,320.
Office Action dated Mar. 26, 2014 in U.S. Appl. No. 13/489,340.
Office Action dated Mar. 26, 2014 in U.S. Appl. No. 13/489,355.
Advisory Action dated Apr. 15, 2014 in U.S. Appl. No. 13/488,197.
Office Action dated Aug. 13, 2014 in U.S. Appl. No. 13/827,935.
Final Office Action dated Aug. 13, 2014 in U.S. Appl. No. 13/489,274.
Office Action dated Aug. 13, 2014 in U.S. Appl. No. 14/319,930.
Office Action dated Aug. 14, 2014 in U.S. Appl. No. 14/319,438.
Final Office Action dated Aug. 14, 2014 in U.S. Appl. No. 13/489,295.
Office Action dated Aug. 15, 2014 in U.S. Appl. No. 14/320,091.
Final Office Action dated Aug. 15, 2014 in U.S. Appl. No. 13/489,320.
Final Office Action dated Aug. 19, 2014 in U.S. Appl. No. 13/489,340.
Final Office Action dated Aug. 25, 2014 in U.S. Appl. No. 13/489,355.
Office Action dated Aug. 27, 2014 in U.S. Appl. No. 14/320,367.
Office Action dated Aug. 29, 2014 in U.S. Appl. No. 14/320,217.
Office Action dated Sep. 5, 2014 in U.S. Appl. No. 14/320,341.
Advisory Action dated Sep. 18, 2014 in U.S. Appl. No. 13/489,295.
Advisory Action dated Sep. 23, 2014 in U.S. Appl. No. 13/489,320.
Advisory Action dated Sep. 23, 2014 in U.S. Appl. No. 13/489,274.
Advisory Action dated Sep. 23, 2014 in U.S. Appl. No. 13/489,340.
Advisory Action dated Sep. 24, 2014 in U.S. Appl. No. 13/489,355.
Office Action dated Oct. 2, 2014 in U.S. Appl. No. 14/320,303.
Office Action dated Oct. 2, 2014 in U.S. Appl. No. 14/320,153.
Office Action dated Oct. 2, 2014 in U.S. Appl. No. 14/320,263.
Office Action dated Feb. 20, 2015 in U.S. Appl. No. 13/488,197.
Final Office Action dated Mar. 20, 2015 in U.S. Appl. No. 14/319,438.
Final Office Action dated Mar. 20, 2015 in U.S. Appl. No. 13/827,935.
Final Office Action dated Mar. 20, 2015 in U.S. Appl. No. 14/320,091.
Final Office Action dated Mar. 20, 2015 in U.S. Appl. No. 14/320,263.
Final Office Action dated Mar. 20, 2015 in U.S. Appl. No. 14/320,341.
Final Office Action dated Mar. 20, 2015 in U.S. Appl. No. 14/320,367.
Final Office Action dated Mar. 31, 2015 in U.S. Appl. No. 14/319,930.
Final Office Action dated Mar. 31, 2015 in U.S. Appl. No. 14/320,303.
Final Office Action dated Apr. 6, 2015 in U.S. Appl. No. 14/320,153.
Final Office Action dated Apr. 6, 2015 in U.S. Appl. No. 14/320,217.
Advisory Action dated Jun. 2, 2015 in U.S. Appl. No. 13/827,935.
Advisory Action dated Jun. 2, 2015 in U.S. Appl. No. 14/320,263.
Advisory Action dated Jun. 2, 2015 in U.S. Appl. No. 14/320,303.
Advisory Action dated Jun. 3, 2015 in U.S. Appl. No. 14/320,091.
Advisory Action dated Jun. 3, 2015 in U.S. Appl. No. 14/320,341.
Advisory Action dated Jun. 4, 2015 in U.S. Appl. No. 14/319,438.
Advisory Action dated Jun. 4, 2015 in U.S. Appl. No. 14/319,930.
Advisory Action dated Jun. 4, 2015 in U.S. Appl. No. 14/320,367.
Advisory Action dated Jun. 10, 2015 in U.S. Appl. No. 14/320,217.
Advisory Action dated Jun. 17, 2015 in U.S. Appl. No. 14/320,153.

(56) References Cited

OTHER PUBLICATIONS

Office Action dated Jun. 30, 2015 in U.S. Appl. No. 13/488,285.
Office Action dated Aug. 26, 2015 in U.S. Appl. No. 13/827,935.
Office Action dated Aug. 27, 2015 in U.S. Appl. No. 14/320,217.
Office Action dated Aug. 27, 2015 in U.S. Appl. No. 14/320,091.
Office Action dated Sep. 2, 2015 in U.S. Appl. No. 14/319,438.
Office Action dated Sep. 8, 2015 in U.S. Appl. No. 14/319,930.
Final Office Action dated Sep. 9, 2015 in U.S. Appl. No. 13/488,197.
Office Action dated Sep. 10, 2015 in U.S. Appl. No. 14/320,367.
Office Action dated Sep. 11, 2015 in U.S. Appl. No. 14/320,303.
Office Action dated Oct. 22, 2015 in U.S. Appl. No. 13/489,274.
Office Action dated Nov. 9, 2015 in U.S. Appl. No. 13/489,355.
Advisory Action dated Nov. 9, 2015 in U.S. Appl. No. 13/488,197.
Office Action dated Nov. 10, 2015 in U.S. Appl. No. 13/489,295.
Office Action dated Nov. 10, 2015 in U.S. Appl. No. 13/489,340.
Office Action dated Nov. 13, 2015 in U.S. Appl. No. 13/489,320.
Notice of Allowance dated Dec. 2, 2015 in U.S. Appl. No. 14/319,438.
Notice of Allowance dated Dec. 11, 2015 in U.S. Appl. No. 14/320,091.
Corrected Notice of Allowability dated Dec. 30, 2015 in U.S. Appl. No. 14/320,091.
Notice of Allowance dated Jan. 6, 2016 in U.S. Appl. No. 14/320,263.
Notice of Allowance dated Jan. 6, 2016 in U.S. Appl. No. 14/320,303.
Notice of Allowance dated Jan. 6, 2016 in U.S. Appl. No. 14/320,367.
Notice of Allowance dated Jan. 11, 2016 in U.S. Appl. No. 14/320,153.
Notice of Allowance dated Jan. 13, 2016 in U.S. Appl. No. 14/320,217.
Office Action dated Jan. 22, 2016 in U.S. Appl. No. 13/488,197.
Notice of Allowance dated Jan. 25, 2016 in U.S. Appl. No. 14/320,341.
Final Office Action dated Feb. 1, 2016 in U.S. Appl. No. 13/827,935.
Notice of Allowance dated Feb. 12, 2016 in U.S. Appl. No. 14/319,930.
Notice of Allowance dated Mar. 22, 2016 in U.S. Appl. No. 13/827,935.
Notice of Allowance dated Apr. 5, 2016 in U.S. Appl. No. 14/966,715.
Notice of Allowance dated Apr. 12, 2016 in U.S. Appl. No. 14/966,880.
Final Office Action dated Jun. 16, 2016 in U.S. Appl. No. 13/488,285.
Final Office Action dated Aug. 10, 2016 in U.S. Appl. No. 13/489,320.
Final Office Action dated Aug. 11, 2016 in U.S. Appl. No. 13/489,295.
Final Office Action dated Aug. 11, 2016 in U.S. Appl. No. 13/489,340.
Final Office Action dated Aug. 15, 2016 in U.S. Appl. No. 13/488,197.
Advisory Action dated Aug. 18, 2016 in U.S. Appl. No. 13/488,285.
Notice of Allowance dated Aug. 23, 2016 in U.S. Appl. No. 13/489,355.
Notice of Allowance dated Sep. 12, 2016 in U.S. Appl. No. 13/489,274.
Notice of Allowance dated Sep. 26, 2016 in U.S. Appl. No. 15/055,999.
Notice of Allowance dated Sep. 27, 2016 in U.S. Appl. No. 15/085,025.
Office Action dated Oct. 4, 2016 in U.S. Appl. No. 15/138,849.
Advisory Action dated Oct. 17, 2016 in U.S. Appl. No. 13/489,295.
Advisory Action dated Oct. 17, 2016 in U.S. Appl. No. 13/489,340.
Advisory Action dated Oct. 19, 2016 in U.S. Appl. No. 13/489,320.
Office Action dated Oct. 28, 2016 in U.S. Appl. No. 15/138,878.
Advisory Action dated Nov. 7, 2016 in U.S. Appl. No. 13/488,197.
Office Action dated Dec. 27, 2016 in U.S. Appl. No. 15/010,929.
Office Action dated Mar. 20, 2017 in U.S. Appl. No. 13/488,197.
Final Office Action dated Apr. 21, 2017 in U.S. Appl. No. 15/138,878.
Final Office Action dated Apr. 24, 2017 in U.S. Appl. No. 15/138,849.
Notice of Allowance dated May 5, 2017 in U.S. Appl. No. 15/010,929.
Notice of Allowance dated Jun. 7, 2017 in U.S. Appl. No. 15/138,878.
Advisory Action dated Jun. 14, 2017 in U.S. Appl. No. 15/138,849.
Notice of Allowance dated Jun. 15, 2017 in U.S. Appl. No. 13/488,285.
Notice of Allowance dated Jun. 15, 2017 in U.S. Appl. No. 13/489,340.
Office Action dated Jul. 3, 2017 in U.S. Appl. No. 15/138,849.
Office Action dated Jul. 19, 2017 in U.S. Appl. No. 13/489,295.
Office Action dated Jul. 19, 2017 in U.S. Appl. No. 13/489,320.
Notice of Allowance dated Oct. 12, 2017 in U.S. Appl. No. 15/138,849.

* cited by examiner

TAILORED CONTENT WITH TAILORED OPTIONS RELATED TO REMINDERS

CROSS REFERENCE TO RELATED APPLICATIONS

This application is a continuation of, claims priority to and the benefit of, U.S. Ser. No. 15/138,849 filed on Apr. 26, 2016 and entitled "IDENTIFYING AND DELIVERING TAILORED CONTENT BASED A REMINDER." The '849 application is a continuation of, claims priority to and the benefit of, U.S. Pat. No. 9,349,137 issued May 24, 2016 (aka U.S. Ser. No. 14/966,715 filed on Dec. 11, 2015 and entitled "SYSTEMS AND METHODS FOR IDENTIFYING AND DELIVERING TAILORED CONTENT BASED UPON A SERVICE DIALOG." The '715 application is a continuation of, claims priority to and the benefit of, U.S. Pat. No. 9,245,250 issued on Jan. 26, 2016 (aka U.S. Ser. No. 14/319,438 filed on Jun. 30, 2014) entitled "SYSTEMS AND METHODS FOR IDENTIFYING AND DELIVERING TAILORED CONTENT BASED UPON A SERVICE DIALOG." The '438 application is a continuation of, claims priority to and the benefit of, U.S. Pat. No. 9,355,378 issued on May 31, 2016 (aka U.S. Ser. No. 13/827,935 filed on Mar. 14, 2013 and entitled "SYSTEMS AND METHODS FOR IDENTIFYING AND DELIVERING TAILORED CONTENT BASED UPON A SERVICE DIALOG." All of the aforementioned applications are incorporated by reference herein in their entirety.

FIELD

The present disclosure generally relates to electronic communication. More particularly, the present disclosure relates to tailored electronic communication.

BACKGROUND

Many consumers interact on a frequent basis with a variety of systems and organizations. For example, it is common for many consumers to interact with a variety of merchants and/or merchant systems. However, although some merchants may attempt to collect and/or analyze a variety of purchasing information associated with their customers, these merchants are often unaware of the purchasing activities of their customers with other merchants and/or across a wider array of products and services. In other words, although merchants may attempt to collect data about their customers, many merchants nevertheless obtain, at best, only a fractured and incomplete picture of the preferences and interests of their customers. Due to this shortage of merchant information about consumers, many consumers find little or no assistance in their daily shopping activities. For example, a consumer who is in the mood to eat Italian food may be required to perform a search for a restaurant that serves Italian food, and this search may take several minutes of the consumer's lunch hour. Although many consumers may be interested in reducing their shopping and/or search burdens, consumers are often required to participate quite actively, and at some expenditure of time, in these activities. Thus, a system which reduces these expenditures is desirable, preferably in a manner that tailored to individual consumer interests and needs.

SUMMARY

The present disclosure includes systems, methods, and articles of manufacture for identifying and/or delivering tailored content based upon a service dialog. In various embodiments, the methods described herein can be performed by a variety of computer-based systems, including computer-based systems for processing service dialogs. Such systems can comprise and/or operate with any non-transitory, tangible, computer-readable storage medium.

Therefore, in various embodiments, the systems described herein may receive a request for tailored content, facilitate a service dialog to obtain information related to the request, and communicate a plurality of tailored content based upon the information related to the request. Further, in various embodiments, the systems may identify tailored content based upon a consumer profile, communicate the tailored content to a web client, and/or receive a selection of the tailored content. Further still, in various embodiments, the systems may modify a magazine (e.g., content that is presented electronically) based upon tailored content.

In various embodiments, the methods described herein may comprise identifying tailored content, communicating the tailored content to a web client, and receiving a selection of the tailored content. Tailored content may be based upon a consumer profile, and a payment may be processed in association with the tailored content in response, for example, to the receiving the tailored content. The methods may further comprise identifying tailored content comprising a plurality of tailored options, identifying the tailored content based upon a reminder associated with a consumer, identifying, the tailored content in response to a request by a consumer, and/or communicating information associated with the tailored content to the web client.

In various embodiments, the methods described herein may comprise identifying tailored content based upon a consumer profile, and modifying a magazine based upon the tailored content, wherein the magazine comprises content that is presented electronically. The methods may further comprise communicating the magazine to a web client, identifying a tailored option based upon the consumer profile, communicating the tailored option to a web client, updating the consumer profile based upon a selection of the tailored option, updating the consumer profile based upon a selection of the tailored content, and/or receiving a selection of the tailored option.

In various embodiments, the methods described herein may comprise identifying tailored content, communicating the tailored content to a web client, receiving a selection of the tailored content, receiving a message based service dialog request, and facilitating the message based service dialog request. The methods may further comprise receiving information related to the message based service dialog request, communicating a plurality of tailored options based upon the message based service dialog request, storing the tailored content to a network cloud, transferring the tailored content to a magazine based service dialog, and/or updating a consumer profile based upon the receiving the selection of the tailored content. The service dialog is in a question and answer format.

In various embodiments, the methods described herein may comprise collecting a brand equity metric, collecting a revenue metric, analyzing at least one of the brand equity metric and the revenue metric to demonstrate a business impact associated with the computer-based system, facilitating sharing of tailored content between consumers, forwarding a tailored option from a first consumer to a second consumer, identifying tailored content for a consumer based upon a consumer profile of the consumer and a consumer profile of a consumer in the consumer's social network, and/or linking a first consumer to a second consumer as part of a social network. The brand equity metric may comprise at least one of: a number of downloads associated with an application for facilitating a service dialog, a feedback associated with the application, a number of rewards points awarded to a service dialog customer, and a social media metric associated with the application. The revenue metric may comprise at least one of: a number of service dialog requests associated with a service dialog customer, a transaction history associated with a service dialog customer, a tenure of membership associated with a service dialog customer, a number of service dialog customers, and a cost associated with the computer-based system.

In various embodiments, the methods described herein may comprise generating a consumer profile, identifying tailored content based upon the consumer profile, and/or communicating the tailored content to the consumer based upon a service dialog request. The methods may further comprise generating the consumer profile based upon a transaction history of the consumer, updating the consumer profile based upon a selection of the tailored content by the consumer, generating the consumer profile based upon merchant data, updating the consumer profile in response to a request by a consumer to update the consumer profile, storing the tailored content a network cloud, and/or facilitating payment for an item associated with the tailored content.

In various embodiments, the methods described herein may further comprise receiving a plurality of service dialog requests, and/or prioritizing the plurality of service dialog requests based upon an urgency associated with each of the plurality of service dialog requests. The methods may further comprise prioritizing a service dialog request associated with an item that will occur first in time over a service dialog request associated with an item that will occur later in time, processing the plurality of service dialog requests based upon the urgency associated with each of the plurality of service dialog requests, prioritizing a message based service dialog request over at least one of an application based service dialog request and a magazine based service dialog request, facilitating payment for an item related to at least one of the service dialog requests, identifying tailored content based upon at least one of the service dialog requests, and/or communicating tailored content to a web client in response to one of the plurality of service dialog requests.

In various embodiments, the methods described herein may comprise communicating a payment option for selection based upon a service dialog, receiving a selection of the payment option, and/or facilitating, by the computer-based system and in response to the receiving, a transaction with a transaction account. The methods may further comprise retrieving the transaction account for processing the transaction from a consumer profile, receiving a payment request from a merchant system, remitting payment to the merchant system, processing the transaction, and/or communicating the transaction account to a merchant system. The payment option may comprise an interface option which is displayed by a web client and may be associated with an item associated with a tailored option communicated based upon a consumer profile.

In various embodiments, the methods described herein may comprise displaying, by a first computer-based system for facilitating a service dialog, tailored content, communicating, by the first computer-based system and to a second computer-based system for processing the service dialog, a selection of the tailored content, and/or displaying, by the first computer-based system, a reminder associated with the tailored content. The methods may further comprise communicating, by the first computer-based system and to the second-computer-based system, a service dialog request in response to the reminder, displaying, by the first computer-based system, a payment option in association with the tailored content, receiving, by the first computer-based system and from the second computer-based system, a tailored option in response to the service dialog request, communicating, by the first computer-based system and to the second computer-based system, a selection of the tailored option, retrieving, by the first computer-based system, the tailored content from a network cloud, and/or communicating, by the first computer-based system and to the second computer-based system, a physical location of a web client.

In various embodiments, the methods described herein may comprise communicating a service dialog request, receiving tailored content based upon the service dialog request, and/or communicating a selection of the tailored content. The methods may further comprise displaying a payment option in association with the tailored content, communicating, in response to a question that is based upon the service dialog request, an answer to the question, communicating a reminder based upon a selection of the tailored content, and/or communicating a physical location of the computer-based system. The service dialog request may comprise a request for tailored content. The tailored content may comprise a plurality of tailored options.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Systems in which consumers participate in service dialogs to receive tailored content are disclosed. The detailed description of exemplary embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
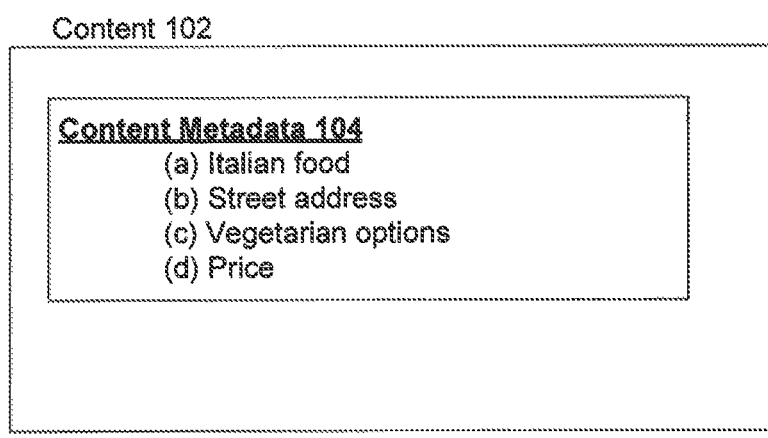
FIG. 1 shows a logical representation of content in accordance with various embodiments.

For illustrative purposes, and with reference to FIG. 1, a logical representation of content 102 is shown. In various embodiments, content 102 may comprise content metadata 104. As described elsewhere herein, content metadata 104 may provide information about content (e.g., one or more attributes or characteristics associated with the content). For example, content metadata 104 may indicate that content 102 (which may comprise, for example, an advertisement or an offer associated with a particular restaurant) is associated with "Italian food," a particular "Street address," "Vegetarian options," and/or a particular "Price."

In various embodiments, a system may "identify" tailored content by creating content, analyzing content in relation to and/or in association with (e.g., based upon) a consumer profile, looking content up and/or locating or identifying content in a database, flat file, and/or lookup table, any combination of these, and/or the like. Moreover, in various embodiments, tailored content may be identified, and a consumer profile may be generated, as described herein as well as in U.S. application Ser. No. 13/488,285, filed Jun. 4, 2012, and entitled SYSTEMS AND METHODS FOR DELIVERING TAILORED CONTENT BASED UPON A CONSUMER PROFILE, which is incorporated by reference herein in its entirety.

Figure 2:
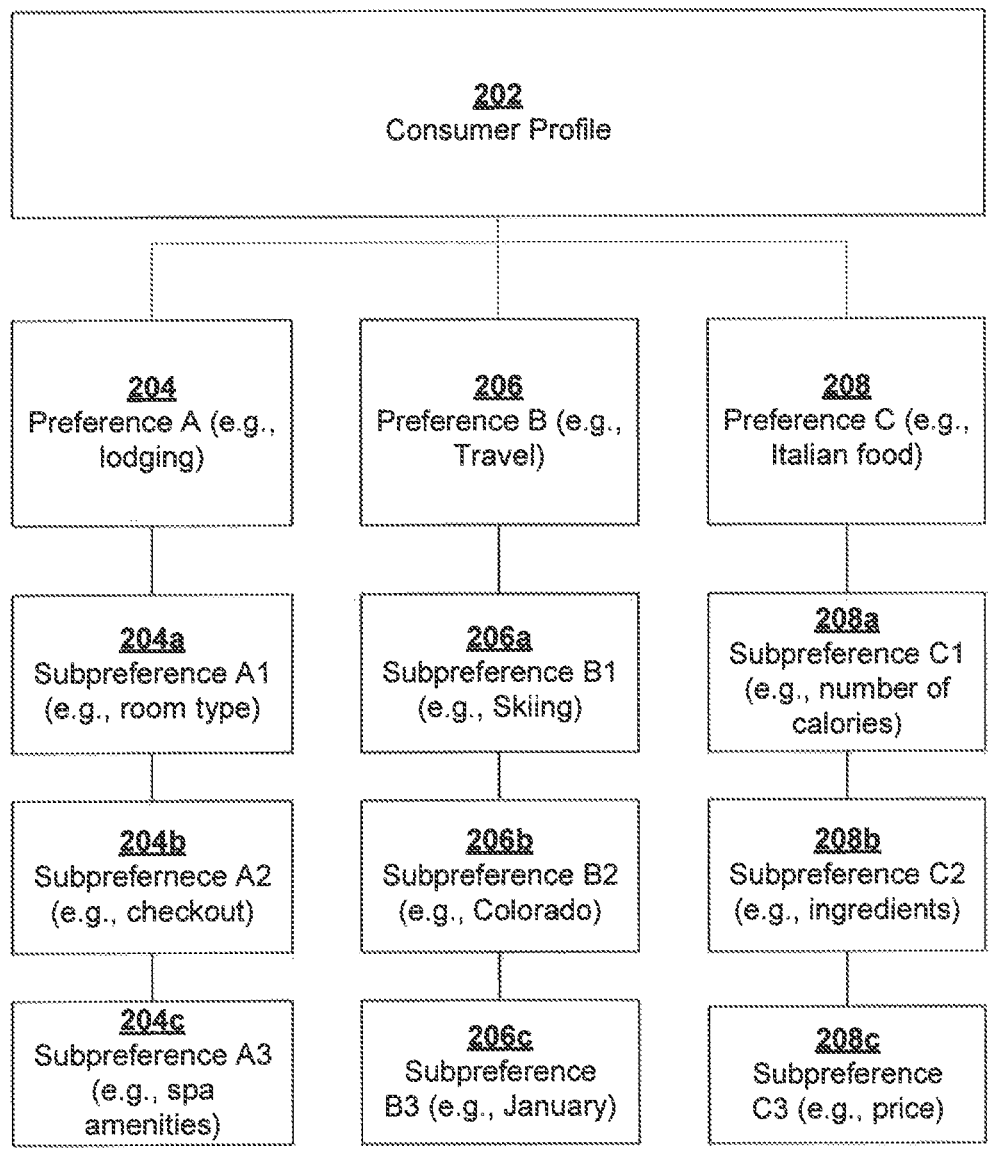
FIG. 2 shows a logical representation of a consumer profile in accordance with various embodiments.

A "consumer profile" or "consumer profile data" may comprise any information or data about a consumer that describes a preference and/or interest of the consumer. For illustrative purposes, a logical representation of an exemplary consumer profile or consumer profile data is depicted at FIG. 2. However, FIG. 2 should be regarded as illustrative only. Consumer profile data may be organized in other ways, all of which are contemplated by the present disclosure. Therefore, as shown, consumer profile 202 may be organized as a set of relational data, and this data may be saved, for example, in a database structure (e.g., a consumer profile database). Thus, consumer profile 202 may comprise one or more categories or preferences (e.g., preferences 204-208), each of which may be related to an item and/or content in which a consumer may have an interest. As also shown, each preference 204-208 may comprise one or more subcategories or subpreferences (e.g., subpreferences 204a-c, 206a-c, and/or 208a-c). Each subpreference may describe an additional feature associated with each preference and/or a more detailed preference. Thus, for example, where a preference 204 describes a consumer's lodging preferences, a first subpreference 204a may describe a preference associated with a room type (e.g., smoking, non-smoking, bed size/type, etc.). Similarly, a second subpreference 204b may describe a preference associated with checkout (e.g., late checkout, early checkout, etc.), while a third subpreference 204c may describe a consumer's preferences associated with spa amenities (e.g., massage, pool, etc.)

A consumer profile may include certain personally identifying information (or "PII") and/or other information associated with a consumer. However, in various embodiments, a consumer profile may not include PII. Where a consumer profile includes PII, however, a consumer may leverage a consumer profile, for example, to automatically enter data in a web based form and/or to facilitate processing of a purchase transaction.

A consumer profile may be based upon a variety of data. For example, a consumer profile may be based upon data that is received, culled, collected, and/or derived from a variety of sources, such as a consumer's transaction history, data associated with or available via a consumer's social networking profile (e.g., a consumer's Facebook® profile), data associated with a customer's physical location, and/or other publicly and/or privately available sources of information about a consumer. In various embodiments, a consumer profile may not be based upon such data, unless a consumer opts in or requests that such data be used.

Further, a consumer profile may be based upon data contributed by a consumer, a merchant, a third party, and/or an SDE (as described herein). In various embodiments, such data may comprise, for example, a consumer's personal information, e.g., a consumer's date of birth, a consumer's residence information, an address of the consumer's work, a specific preference associated with the consumer (e.g., a preference for a certain type of vacation, such as a preference for a tropical vacation), a website in which the consumer is interested, and the like. Further, in various embodiments, a consumer may contribute data towards a consumer profile by way of a form and/or questionnaire, such as, for example, a web-based form or questionnaire.

With further regard to the types of data a consumer may contribute, in general, a consumer may contribute any information that the consumer would like to serve as a basis for a consumer profile. For instance, a consumer may contribute location data (e.g., data associated with a global positioning system, a home address, a work address, family location data, data about a consumer's most shopped or favorite shopping locations, data about a consumer's most visited or favorite places), data associated with a consumer's favorite websites, digital destinations, or magazines (e.g., blogs, news websites, shopping websites, research websites, financial websites, etc.), personal data (e.g., email addresses, physical addresses, phone numbers, age information, income information, expenses information, etc.), data associated with a consumer's status or mode of travel (e.g., vacation data, business data, personal data, airline data, lodging data, etc.), data associated with a consumer's favorite items (e.g., food, restaurants, groceries, electronics, music, gaming, clothing types, hobbies, fitness, etc.), and the like.

Moreover, with respect to the types of data a merchant may contribute, in various embodiments, exemplary data may include online tracking cookie data, web beacon data, web tracking data, web packet trace data, digital fingerprint data, clickstream data, purchase or transaction history data, data entered by a consumer in a web based form, data purchased by the merchant about the consumer, social networking data, banking and/or credit card data, stock keeping unit ("SKU") data, transactional and/or budget data, coupon data, retail data (e.g., items purchased, wish lists, etc.), data from third party personal data aggregators, search engine data, and/or any other data which the merchant may have in its possession or to which the merchant may gain access.

A consumer may specify that a consumer profile may be based upon certain data, but that the profile should not be based upon other data. For example, a consumer may specify that the consumer's profile may be based upon data associated with the consumer's transaction history, but may not be based upon data culled from the consumer's social networking profile.

As used herein, a "service dialog" may comprise any communication between a consumer and a service dialog system (as described herein) and/or a "service dialog agent." As used herein, a service dialog agent may be an individual, such as, for example, a consumer service representative. In various embodiments, a service dialog agent may interface with a service dialog system to facilitate and/or participate in a service dialog. Moreover, for simplicity, as used herein, a service dialog system and a service dialog agent may be referred to, individually or collectively, as a "service dialog entity," or "SDE."

Accordingly, a service dialog may comprise a communication between a consumer and an SDE (e.g., a service dialog system and/or a service dialog agent) in which the SDE identifies and/or delivers tailored content (as described herein) to the consumer. In various embodiments, a service dialog may include (and/or begin with) a request by a consumer for a service dialog (e.g., a request by a consumer for tailored content). However, a service dialog may not include such a request. Rather, a service dialog may be initiated by a service dialog entity based upon a consumer profile and/or based upon another criterion, such as a reminder, as described herein. Thus, in various embodiments, tailored content may be identified for and/or delivered to a consumer in the absence of a specific request for such content.

In general, tailored content may be identified for and/or delivered to consumers based upon a service dialog and/or a consumer profile. For example, tailored content may be identified based upon an analysis performed by an SDE (e.g., a system owned by a transaction account issuer, such as American Express Travel Related Services Company, Inc., which maintains closed loop or internal data, as described elsewhere herein). Further, in various embodiments, the analysis may be based upon content supplied or transmitted to a SDE by a merchant system.

Figure 3:
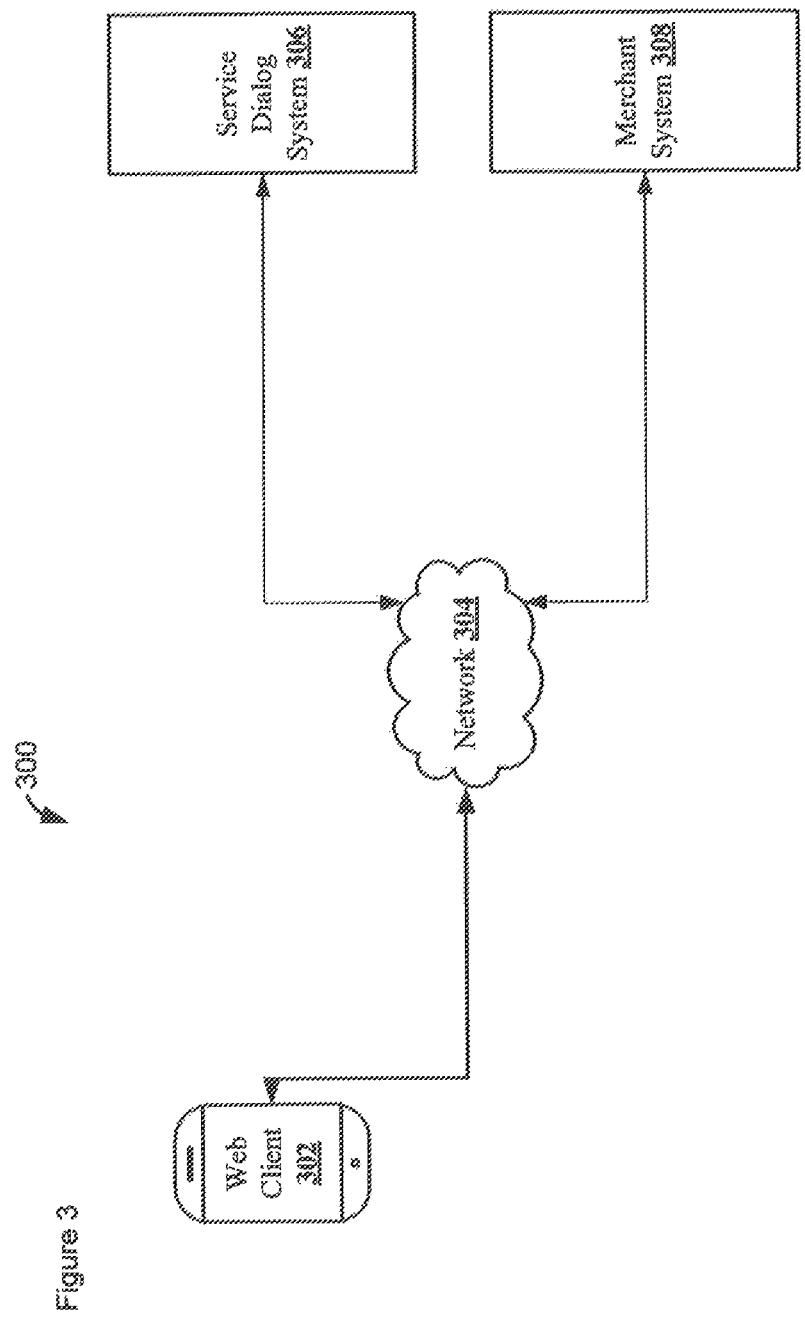
FIG. 3 shows an exemplary system diagram in accordance with various embodiments.

Accordingly, and with reference to FIG. 3, an exemplary system 300 for aggregating consumer profile data and/or identifying tailored content is disclosed. In various embodiments, system 300 may comprise a web client 302, a network 304, a service dialog system 306, and/or a merchant system 308.

Web client 302 may include any device (e.g., a personal computer, a mobile communications device, and the like) which communicates via any network, for example such as those discussed herein. Web client 302 may include one or more browsers or browser applications and/or application programs, including browser applications comprising Internet browsing software installed within a computing unit or a system to conduct online transactions and/or communications. For example, in various embodiments, web client 302 may include (and run) MICROSOFT® INTERNET EXPLORER®, MOZILLA® FIREFOX®, GOOGLE® CHROME®, APPLE® Safari, and/or any software package available for browsing the Internet.

A computing unit or system may take the form of a computer or set of computers, although other types of computing units or systems may be used, including tablets, laptops, notebooks, hand held computers, personal digital assistants, cellular phones, smart phones, set-top boxes, workstations, computer-servers, main frame computers, mini-computers, PC servers, pervasive computers, network sets of computers, personal computers, such as IPADS®, iMACs®, and MACBOOKS®, kiosks, terminals, point of sale (POS) devices and/or terminals, televisions, GPS receivers, in-dash vehicle displays, and/or any other device capable of receiving data over a network. The computing unit of the web client 302 may be further equipped with an Internet browser connected to the Internet or an intranet using standard dial-up, cable, DSL or any other Internet protocol known in the art. Transactions originating at a web client 302 may pass through a firewall in order to prevent unauthorized access from users of other networks. Further, additional firewalls may be deployed between the varying components of system 300 to further enhance security.

Web client 302 may or may not be in direct contact with an application server. For example, web client 302 may access the services of an application server through another server and/or hardware component, which may have a direct or indirect connection to an Internet server. For example, web client 302 may communicate with an application server via a load balancer and/or a web server. In an exemplary embodiment, access is through a network or the Internet through a commercially-available web-browser software package.

Web client 302 may further include an operating system (e.g., WINDOWS® NT/95/98/2000/XP/Vista/7/8/CE/Mobile, OS2, UNIX, Linux, Solaris, MacOS, PALMOS®, etc.) as well as various conventional support software and drivers typically associated with computers. Web client 302 may be in a home or business environment with access to a network. Web client 302 may implement security protocols such as Secure Sockets Layer (SSL) and Transport Layer Security (TLS). Web client 302 may further implement several application layer protocols including http, https, ftp, and sftp.

Network 304 may include any electronic communications system or method which incorporates hardware and/or software components (e.g. a "cloud" or "cloud computing" system, as described herein). Communication among parties via network 304 may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system 300 is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If network 304 is in the nature of a public network, such as the Internet, it may be advantageous to presume network 304 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0

(1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently and separately or collectively suitably coupled to network 304 via data links which include, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that network 304 may be implemented variously, such as, for example, as an interactive television (ITV) network. Moreover, this disclosure contemplates the use, sale or distribution of any goods, services or information over any network having similar functionality described herein.

As used herein, a "cloud" or "cloud computing" may describe a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing, which is hereby incorporated by reference in its entirety.

Service dialog system 306 may comprise hardware and/or software configured to generate a consumer profile and/or identify tailored content based upon a consumer profile and/or a variety of other criteria, as described herein. Service dialog system 306 may thus, in various embodiments, process and/or facilitate a service dialog. In various embodiments, service dialog system 306 may be associated with a transaction account issuer (e.g., American Express, Visa, Mastercard, etc). Moreover, in certain embodiments (e.g., where service dialog system 306 is associated with American Express), the system 306 may comprise a variety of "closed loop" transaction data (or internal data) associated with a consumer (e.g., as described herein). In various embodiments, service dialog system 306 may comprise a three-tiered server architecture. For example, service dialog system 306 may comprise a web server, an application server, a consumer profile database, and/or a content database.

A consumer profile database may comprise hardware and/or software configured to store data. For example, a profile database may comprise a server appliance running a suitable server operating system (e.g., MICROSOFT® INTERNET INFORMATION SERVICES® or, "IIS") and having database software (e.g., ORACLE® installed thereon. In various embodiments, a consumer profile database may store a consumer profile.

A content database may comprise hardware and/or software configured to store data. For example, a content database may comprise a server appliance running a suitable server operating system (e.g., MICROSOFT® INTERNET INFORMATION SERVICES® or, "IIS") and having database software (e.g., ORACLE®) installed thereon. In various embodiments, a content database may store content, which may, for example, be uploaded to the database by one or more merchant systems 308.

Merchant system 308 may comprise any hardware and/or software associated with and/or owned and/or operated by a merchant, as described above. In various embodiments, merchant system 308 may comprise a web client, a web server, and/or an application server. Merchant system 308 may communicate over network 304. In various embodiments, as described, merchant system 308 may communicate content to service dialog system 306.

Referring broadly now to FIGS. 4-10, the process flows, logical representations, and/or screen shots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 4-10 but also to the various system components and/or logical representations as described above with reference to FIGS. 1-3.

Figure 4:
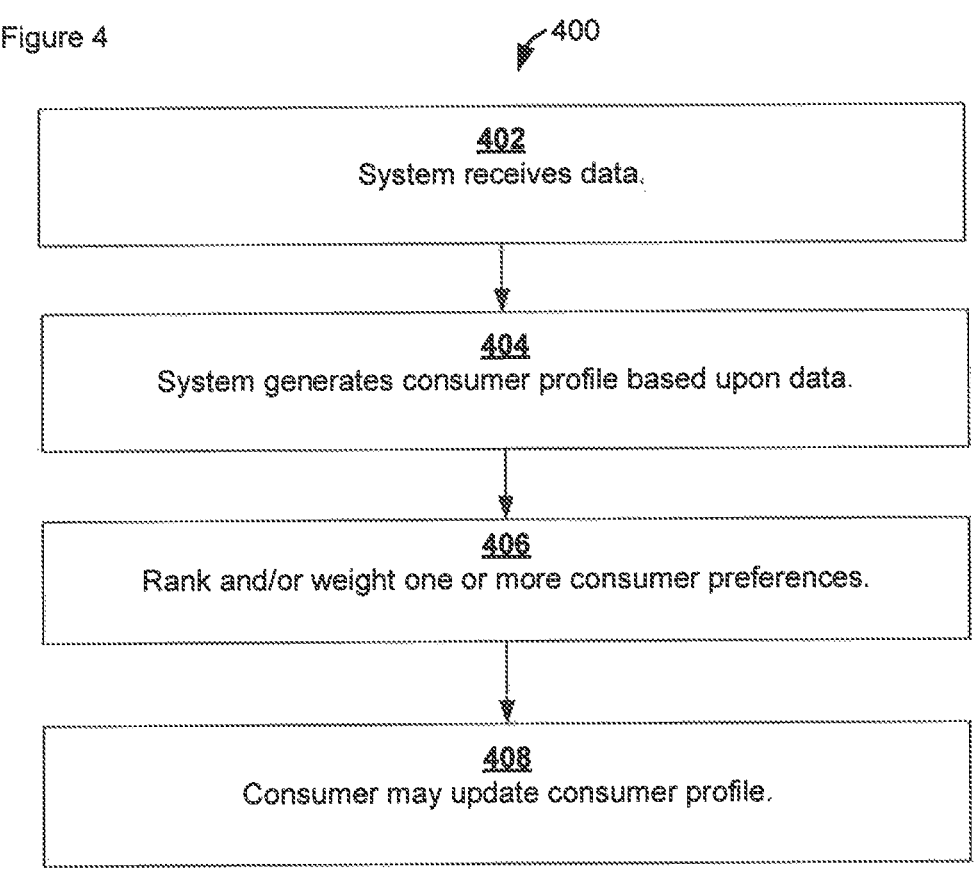
FIG. 4 shows a flowchart depicting an exemplary process for generating a consumer profile.

With reference now to FIG. 4, a process 400 for generating a consumer profile is described. In general, a consumer profile may be based upon a variety of data, as described herein. Thus, as shown, service dialog system 306 may receive data (step 402). For example, service dialog system 306 may receive from a consumer (e.g., a consumer operating a web client 302 to fill out a web-based form or questionnaire) a particular preference or interest of the consumer (e.g., an interest in a tropical vacation), and/or service dialog system 306 may receive or collect data associated with a consumer's transaction history, from which service dialog system 306 may determine, in various embodiments, that the consumer has a particular preference or interest (e.g., because the consumer's transaction history shows a pattern of vacationing in European locales during the springtime, service dialog system 306 may infer or determine based upon the transaction history that the consumer is interested in vacationing in such locales during the springtime).

A consumer may contribute data to a consumer profile, in various embodiments, by registering to receive a consumer account and/or authenticating (e.g., using a standard two factor authentication process, such as a username and password) to an existing consumer account. A consumer account may give access to and/or be associated with a consumer profile. Thus, in various embodiments, a consumer may register for and/or authenticate to a consumer account, and, having done so, the consumer may contribute data. In various embodiments, service dialog system 306 may perform the authentication and/or validate the consumer account.

Likewise, a merchant and/or a merchant system 308 (which may both be referred to herein, for simplicity, as merchant system 308) may contribute data, in various embodiments, toward a consumer preference in a variety of ways. For example, merchant system 308 may register to receive a merchant account and/or authenticate (e.g., using a standard two factor authentication process, such as a username and password) to an existing merchant account. A merchant account may permit merchant system 308 to transmit data associated with a consumer and/or content associated with the merchant (e.g., advertising and/or offer information associated with the products and services of the merchant) to service dialog system 306.

Thus, in various embodiments, merchant system 308 may register for and/or authenticate to a merchant account prior to transmitting data associated with a consumer. In various embodiments, service dialog system 306 may perform the authentication and/or validate the merchant account. Further, in various embodiments, merchant system 308 may not register for and/or authenticate to a merchant account. Rather, merchant system 308 may simply transmit data associated with a consumer to service dialog system 306 (e.g., without authenticating to a merchant account).

Having received data, service dialog system 306 may generate a consumer profile based upon the data (step 404). In various embodiments, a consumer profile may be generated by analyzing the data to identify or determine one or more patterns and/or preferences in and/or associated with the data. Although innumerable patterns and/or preferences may be identified, several examples are shown below to illustrate a consumer profile generation process.

Accordingly, and for example, service dialog system 306 may generate a consumer profile based upon a consumer's transaction account history (e.g., as described herein) to determine that a threshold percentage or amount of a consumer's purchases were made with respect to (or may be associated with) a particular consumer preference and/or subpreference. More particularly, service provider system 306 may, in various embodiments, determine that a threshold percentage or amount of a consumer's purchases may be associated with a consumer preference, such as "Travel," which may indicate that a consumer spends or has spent in the past (e.g., across the consumer's total transactional history during a specified time period), for example, at least a threshold percentage on purchases related to the consumer preference, and/or that the consumer has spent at least a threshold amount on items related to the particular consumer preference (e.g., where the preference is "Travel," related items may comprise vacations, hotel reservations, guidebooks, etc.)

Service dialog system 306 may similarly determine, for example, that a consumer has contributed data associated with a specific interest or preference (e.g., via a web-based form and/or questionnaire). For example, system 306 may determine that a consumer has specifically contributed an interest in a consumer preference such as "Italian food" and/or items related to Italian food. Where system 306 identifies a specific interest, system 306 may simply add the interest to a consumer profile (e.g., as a preference and/or subpreference).

Further, in various embodiments, service dialog system 306 may determine that a consumer often browses to websites associated with a consumer preference such as "Travel," and/or service dialog system 306 may "scrape," parse, and/or index a website to identify one or more consumer preferences which may be associated with the website (e.g., scraping a travel magazine website may yield preferences for travel, scuba diving, tropical vacations, etc.)

Thus, service dialog system 306 may generate a consumer profile based upon a variety of data. Additionally, in various embodiments, service dialog system 306 may delete any data relied upon for the generation of a consumer profile. Thus, consumers may be assured that their privacy is protected and that only their consumer profile is stored by service dialog system 306. In addition, a consumer profile may comprise summary data and/or data that is not personally identifying. For example, a consumer profile may comprise an age range of a consumer as opposed to a specific age of the consumer. Thus, a consumer's privacy may be further protected where a consumer profile is limited to summary or non-personally identifying information.

In various embodiments, service dialog system 306 may further rank consumer preferences (step 406). For instance, service dialog system 306 may rank one or more consumer preferences and/or subpreferences based upon one or more rules. In various embodiments, service dialog system 306 may rank consumer preferences according to a percentage and/or an amount of spending associated with a consumer preference (e.g., a preference associated with a highest percentage and/or spending amount may be ranked as a highest or most significant preference, while a preference associated with a lower percentage and/or spending amount may be ranked as a lower or less significant preference). Similarly, in various embodiments, a consumer may contribute a consumer preference (e.g., via a form or questionnaire) as well as associate a ranking (e.g., highest to lowest, a number of stars or thumbs up, a numerical scale, and the like) with a contributed consumer preference.

Moreover, in various embodiments (e.g., where a consumer preference is based upon a behavior of a consumer), a consumer preference may be ranked based upon, for example, a frequency of the behavior. For instance, a ranking for a preference associated with a particular website may be based upon a frequency with which a consumer browses to or visits the website (e.g., more frequently browsed and/or visited websites may be ranked higher or as more significant than less frequently browsed or visited websites).

Further, in various embodiments, a preference and/or subpreference may be weighted (step 406). For instance, service dialog system 306 may associate a preference and/or subpreference with a weight indicating how strongly a consumer prefers content (and/or an item) associated with the preference or subpreference. For example, service dialog system 306 may calculate a weight to associate with the preference and/or subpreference based upon all or a portion of data upon which the preference and/or subpreference is based. Thus, where for example a consumer's transaction history suggests a preference for tropical vacations, system 306 may determine that, based upon the consumer's transaction history (and/or other data), a weight of 75% should be associated with the preference for tropical vacations. A weight of 75% may indicate, for example, that system 306 estimates and/or calculates that the consumer will accept an offer related to a tropical vacation 75% of the time and/or that the consumer's browsing history indicates that the consumer clicks on or selects content related to tropical vacations approximately 75% of the time. Further, where a consumer receives content based upon a weighted preference, the consumer's reaction to the content (e.g., whether the consumer accepted an offer tailored and delivered to the consumer based upon the preference) may be factored back into the weighting—e.g., the weighting may be reduced in response to an event that suggests the consumer is not interested in the content (e.g., the consumer does not select or click on the content, the consumer does not accept an offer, etc.), and/or the weighting may be increased or remain unaffected by an event that suggests that the consumer is interested in the content (e.g., selection of the content, acceptance of an offer). Thus, in various embodiments, system 306 may generate a consumer profile, rank, and/or weight one or more member preferences and/or subpreferences comprising the consumer profile.

In various embodiments, a consumer may update or maintain an existing consumer profile (step 408). More particularly, in various embodiments, a consumer may authenticate to an existing consumer account to specify, for example, that a particular data source should not serve as a basis for a consumer profile and/or that a particular data type should not serve as a basis for a consumer profile. Thus, for example, a consumer may specify that a transaction history associated with the consumer should not serve as a basis for generating a consumer profile and/or that a website should not serve as a basis for generating a consumer profile. A consumer may further adjust the types of data (as described elsewhere herein) underlying a consumer profile. For example, a consumer may indicate that the consumer's transaction history that occurs on the weekend is not representative of the consumer's interests during the week and that the consumer's weekend transaction history should therefore be excluded from the data used to generate the consumer's profile. Further still, a consumer may update a consumer profile to exclude a preference and/or subpreference from the consumer's profile. For example, a consumer who only likes to travel during the summertime may exclude a preference and/or subpreference for travel during the wintertime from the consumer's profile.

With reference now to FIGS. 5-11, processes and exemplary screenshots for delivering tailored content based upon a service dialog are shown. More particularly, as described herein, FIGS. 5-11 relate to processes for identifying and/or delivering tailored content based upon a variety of types of service dialogs. For example, as described herein, a service dialog may comprise a message based service dialog, an application based service dialog, and/or a magazine based service dialog. Moreover, although the processes and screenshots depicted in FIGS. 5-11 are shown individually, these processes and/or screenshots may be variously combined. For example, as described herein, process 500 for delivering tailored content based upon a message based service dialog may be combined with process 600 for delivering tailored content based upon an application based service dialog and/or process 700 for delivering tailored content based upon a magazine based service dialog.

Figure 5:
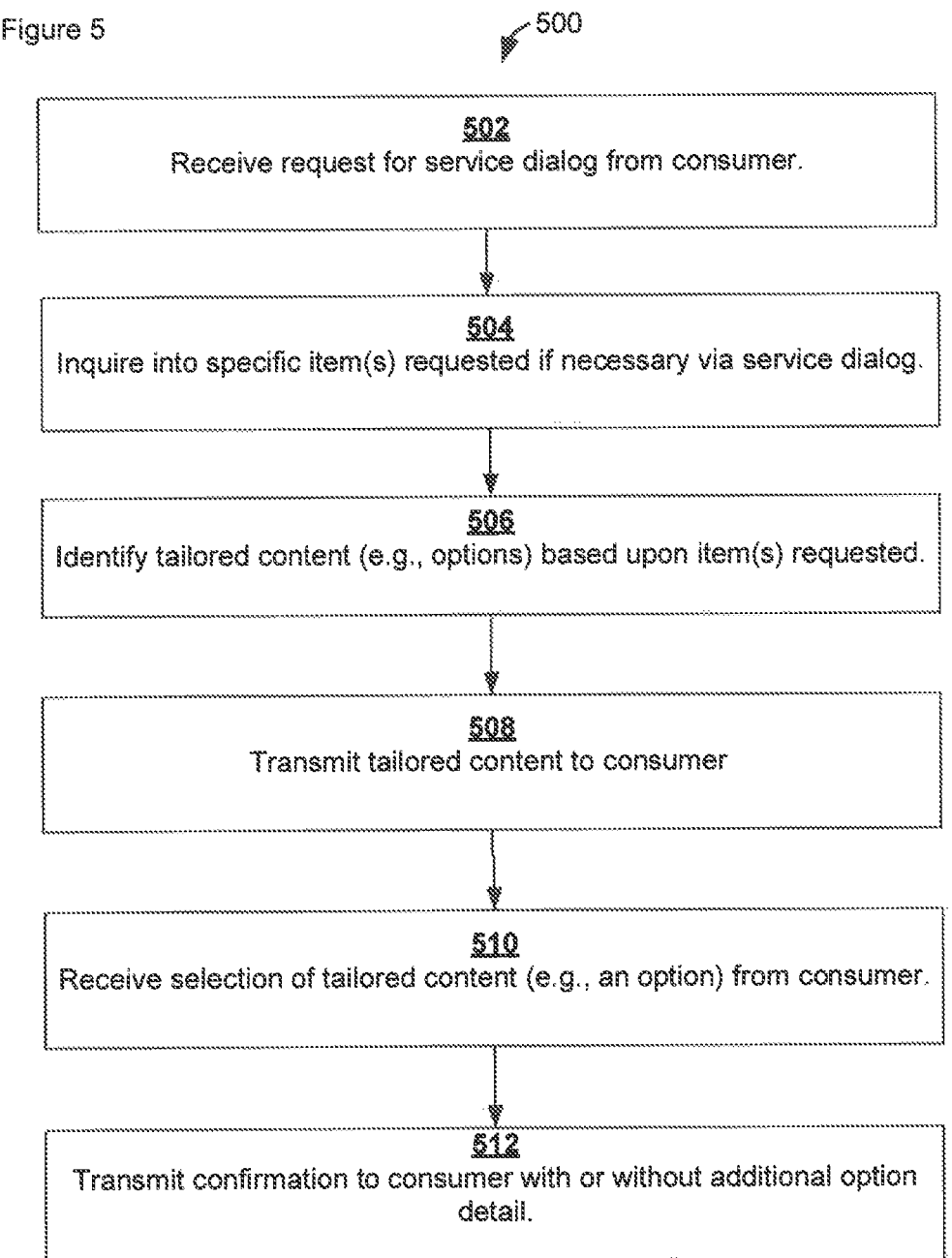
FIG. 5 shows a flowchart depicting an exemplary process for identifying tailored content based upon a message based service dialog.
Figure 6:
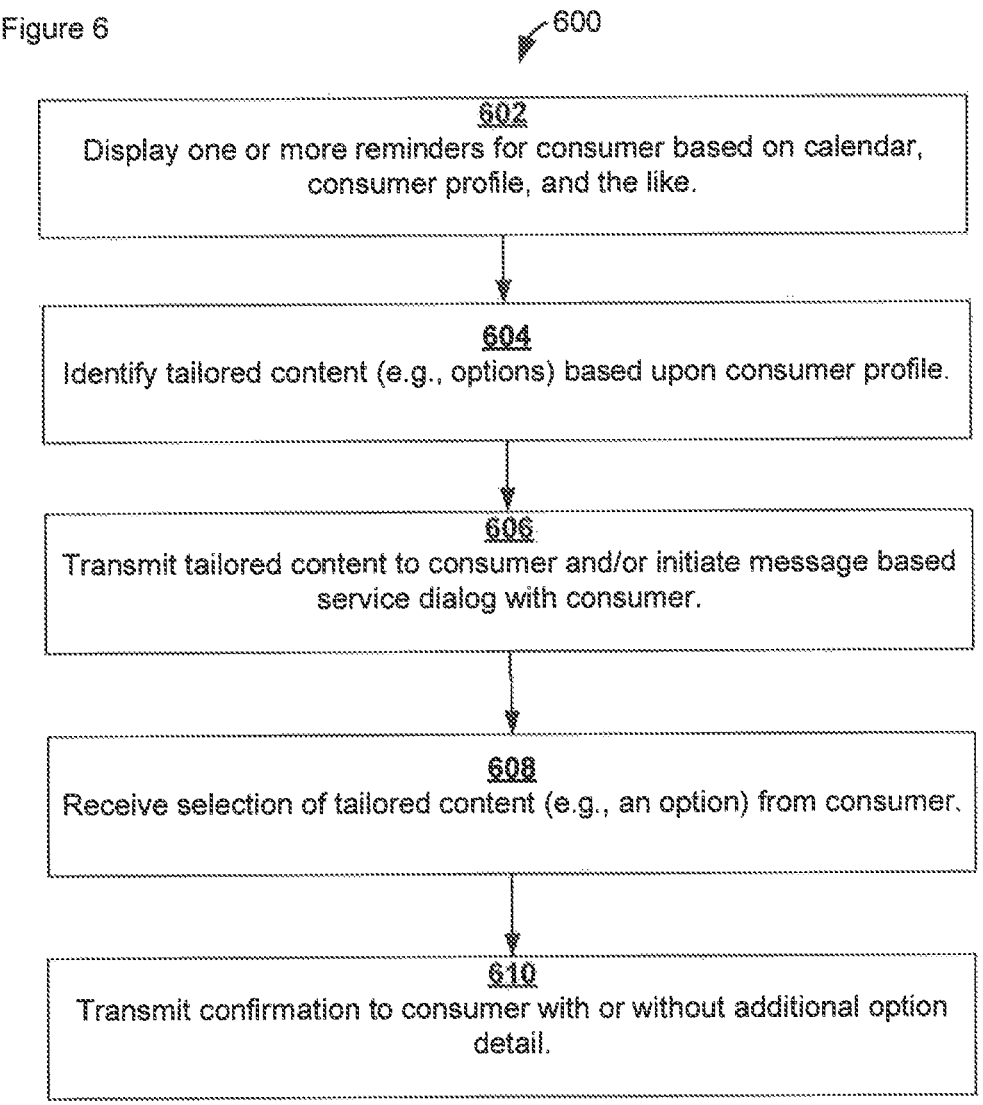
FIG. 6 shows a flowchart depicting an exemplary process for identifying tailored content based upon an application based service dialog.
Figure 7:
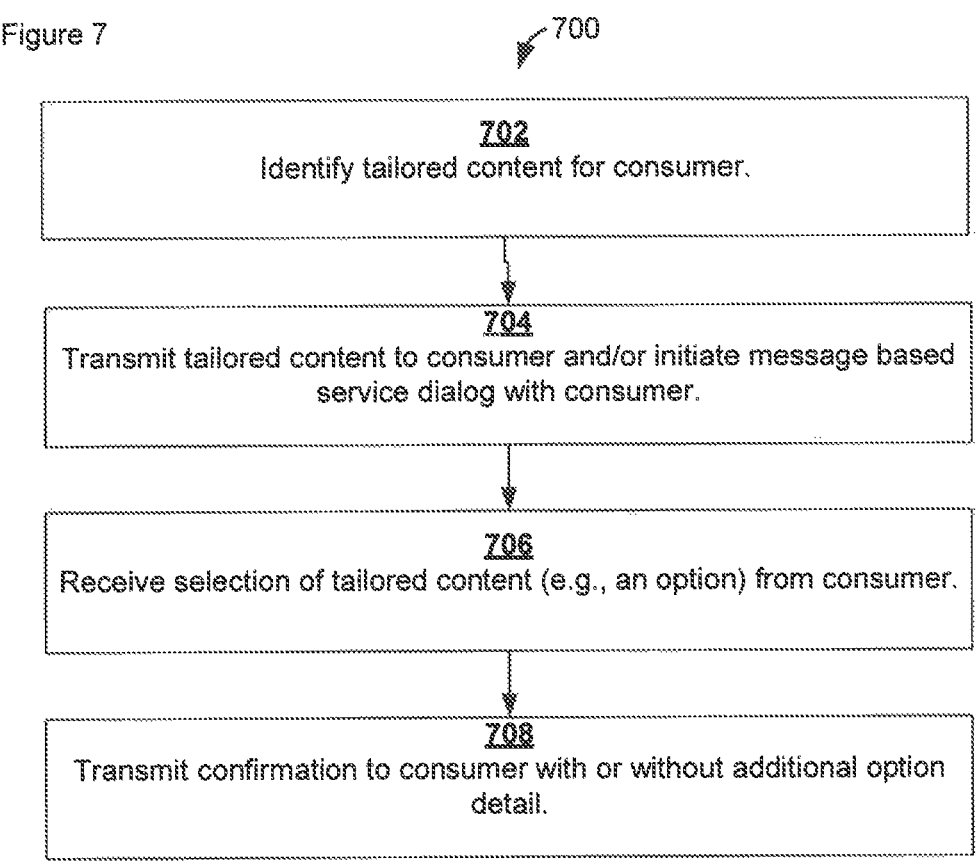
FIG. 7 shows a flowchart depicting an exemplary process for identifying tailored content based upon a magazine based service dialog.
Figure 8:
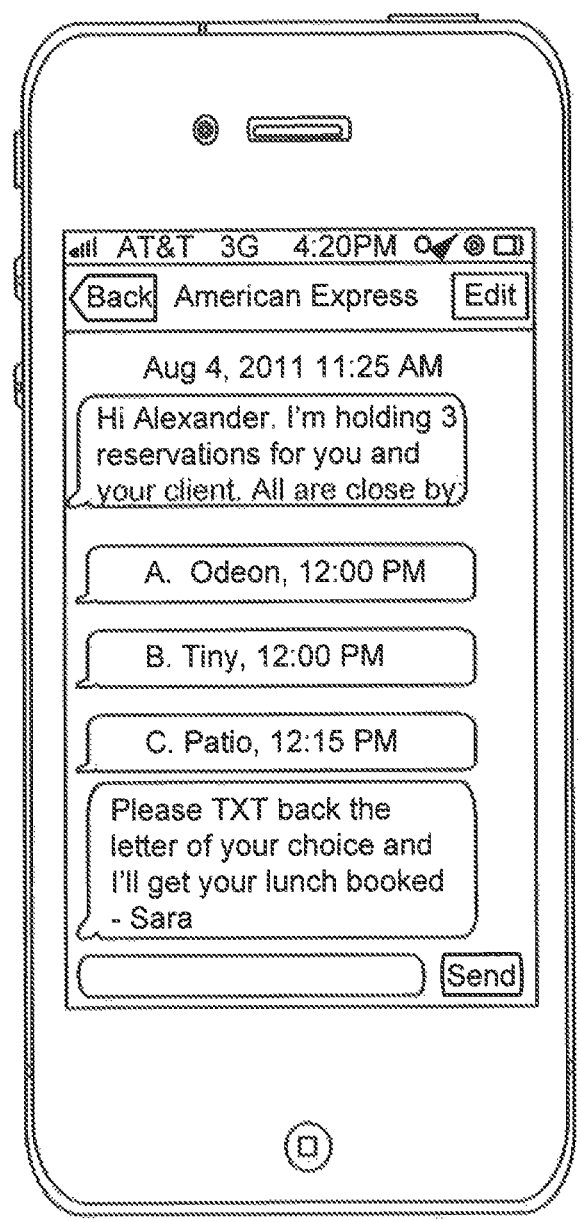
FIG. 8 shows a screenshot depicting an exemplary message based service dialog.

Accordingly, with attention to FIGS. 5 and 8, a process 500 and a screenshot 800 are shown for identifying and/or delivering tailored content based upon a message based service dialog. A message based service dialog may, in various embodiments, comprise a service dialog which takes place, in full or in part, via a messaging feature (e.g., a text messaging feature) associated with a web client 302. As shown, a service dialog entity or SDE (e.g., as described above, a service dialog system 306 and/or a service dialog agent) may receive a request for a service dialog from a consumer (step 502), which may be based upon an interest of the consumer in receiving tailored content related to a particular item.

In general, a service dialog, such as a message based service dialog, may be related to any item and/or content in which a consumer may have an interest. However, to illustrate, a consumer may request, for instance, a service dialog based upon an interest in receiving tailored content related to a restaurant or dining. For example, a consumer may request a service dialog by messaging a request such as, "Lunch for 2 @12:00 pm, someplace quiet for client meeting." An SDE may receive and/or process the request and, if necessary, inquire via the service dialog (e.g., via a message) into specific information associated with the request (step 504). For example, an SDE may inquire whether the consumer would prefer a particular meeting location, e.g., a location that is close to the consumer's office (which, as described herein, may be included, and available to the SDE, as part of a consumer profile). The consumer may, in various embodiments and for example, reply "Yes" or "No" to the location inquiry. The SDE may continue with the service dialog to further inquire, for example, into any relevant dietary restrictions. For example, the SDE may transmit a message to the consumer's web client 302 similar to the following message: "Are there any dietary restrictions?" The consumer may reply, again via web client 302, with a particular dietary restriction, a "Yes," a "No," and the like. Where the consumer answers, "Yes," of course, the SDE may inquire into the particular restriction (and the consumer may reply, for example, that the consumer is a vegetarian). Thus, an SDE may facilitate and/or process a service dialog with a consumer to gather information sufficient to identify content tailored to the consumer's request (or tailored content).

In addition, in various embodiments, a service dialog may be facilitated and/or processed by a service dialog agent. Likewise, in various embodiments, a service dialog, as described above, may be facilitated and/or processed by a service dialog system 306. Further, in various embodiments, a service dialog may be facilitated and/or processed by a service dialog agent working in combination with a service dialog system 306. Where a service dialog system 306 facilitates and/or processes a service dialog (either individually or in combination with an agent), the system 306 may provide access to a consumer profile and/or gain access to a consumer profile, which may be used by the SDE (as described herein) to facilitate and/or process the service dialog. For example, the consumer profile may, as described above, include a work address, which the SDE may use to locate a restaurant that is close to the consumer's work address. Similarly, the consumer profile may include a preference for Italian food and/or a preference as to price (see FIG. 2), which the SDE may use as described herein. Thus, a consumer profile may inform a service dialog such that an SDE may utilize the consumer profile to identify tailored content.

With continuing regard to identification of tailored content, an SDE may identify, in various embodiments, tailored content by comparing a consumer profile and/or the additional information gathered as a result of a service dialog to content (e.g., a number of individuals associated with a request, a time associated with the request, a location associated with the request, and dietary preferences associated with the request, as shown above) (step 506). An SDE may further transmit tailored content to the consumer (step 508).

Where an SDE identifies content based upon a consumer profile, the SDE may identify content, for example, (e.g., content 102, as shown at FIG. 1) based upon a determination that content metadata 104 matches or substantially matches a preference and/or subpreference of a consumer profile. For example, an SDE may determine that content metadata (which may indicate that content 102 is associated with Italian food and a particular price) matches or substantially matches a preference and/or subpreference associated with a consumer profile (see, e.g., consumer profile 202 at FIG. 2, which includes a preference and subpreference for Italian food at a particular price). Further, where an SDE identifies content based upon information obtained as a result of a service dialog, the SDE may, in various embodiments, identify content based upon a determination that content metadata, as described herein, matches or substantially matches the information obtained from the service dialog. For example, with respect to the foregoing example, an SDE may determine that certain content 102 is associated with and/or located within a certain distance of a particular street address (e.g., a work address of a consumer) and/or associated with a particular dietary restriction (e.g., vegetarian dining options). Thus, an SDE may identify tailored content based upon a comparison of content to a consumer profile and/or information obtained during a service dialog.

Accordingly, with continued attention to the example provided above, in response to a request from a consumer, an SDE may message a consumer with information related to a plurality of tailored restaurant offers or options, such as, a first option "A. Odeon, 12:00 PM," a second offer "B. Tiny, 12:00 PM," and/or a third offer "C. Patio, 12:15 PM." Each tailored option may be associated and/or displayed with a reservation time, as shown, and the consumer invited to message back the option, if any, in which he is most interested.

In various embodiments, an SDE may receive a selection of tailored content (e.g., one of the tailored options, as shown), based upon which the SDE may reserve, in this example, the selected restaurant (e.g., Odeon at 12:00 PM, Tiny at 12:00 PM, or Patio at 12:15 PM) and/or cancel reservations for the restaurant options that the consumer does not select (step 510). Having reserved the selected tailored option (and/or more broadly, having acted in response to selection of tailored content), an SDE may transmit a confirmation message to a consumer to confirm the selected reservation (step 512). In addition, in various embodiments, a consumer and/or the consumer's web client 302 may (manually or automatically) set a reminder in response to a confirmation message.

Moreover, in various embodiments, a confirmation and/or tailored content may include a hyperlink or "link" and/or be embedded with a uniform resource locator ("URL"), which a consumer may select or "click on" to receive and/or review additional detail related to the tailored content. For example, where tailored content comprises a plurality of tailored restaurant options, as shown above, a link may be associated with each of the tailored restaurants (e.g., the link may comprise a link to each tailored restaurant's website). Similarly, a link may comprise a link to a map associated with tailored content (e.g., a link may be associated with a map of the area surrounding a selected option) and/or a link to feedback or reviews of an item associated with the tailored content.

In addition, in various embodiments, although a message based service dialog is described above with reference to a request by a consumer for tailored content, in various embodiments, as described herein, a message based service dialog (like an application based service dialog and a magazine based service dialog) may be initiated by an SDE (e.g., in response to an event and/or based upon a variety of other information, such as a location of a consumer, a time of day, a consumer profile, etc.) For example, in various embodiments, an SDE may initiate a service dialog (of any type) based upon a location of a consumer (e.g., a GPS location associated with web client 302). More particularly, in various embodiments, an SDE may identify and deliver tailored content (e.g., a tailored offer or option) to a consumer based upon a consumer profile and a location of the consumer. Thus, to illustrate, a consumer profile indicating a preference for coffee may trigger the identification and delivery of tailored content related to coffee (e.g., a Starbucks offer) based upon a physical proximity of the consumer associated with the profile to a brick and mortar Starbucks location.

Further still, in various embodiments, a consumer may not only message a request for tailored content to an SDE, but search for tailored content (e.g., via a search tool). A consumer may search, as described herein, via any type of service dialog, including a message based service dialog, an application based service dialog, and/or a magazine based service dialog. Moreover, in various embodiments, a consumer may search, for example, by keyword, using a voice recognition feature associated with web client 302, by category of item and/or content, based upon a search history, and the like.

Referring now to FIGS. 6, 9A, 9B, and 9C, a process 600 and screenshots 900A, 900B, and 900C are shown for identifying and/or delivering tailored content based upon an application based service dialog. An application based service dialog may, in various embodiments, comprise a service dialog which takes place, in full or in part, via an application and/or micro-application (e.g., as described herein) associated with a web client 302. As shown, an SDE may identify and/or deliver tailored content (as described herein) based upon a variety of information and/or criteria (e.g., a request by a consumer for tailored content, a location of the consumer, a time of day, an event, a consumer profile, etc.) Thus, in various embodiments and for example, an SDE may identify tailored content based upon an event, such as a reminder. As described herein, an event such as a reminder may be based upon a variety of criteria. However, to illustrate, a reminder may be set by a consumer and/or an SDE in response to a confirmation of a tailored option (as described above). Likewise, an event like a reminder may be based upon a calendar of the consumer, such as a calendar associated with the consumer's web client 302, and/or an event such as a reminder may be based upon a consumer profile (step 602).

Figure 9A:
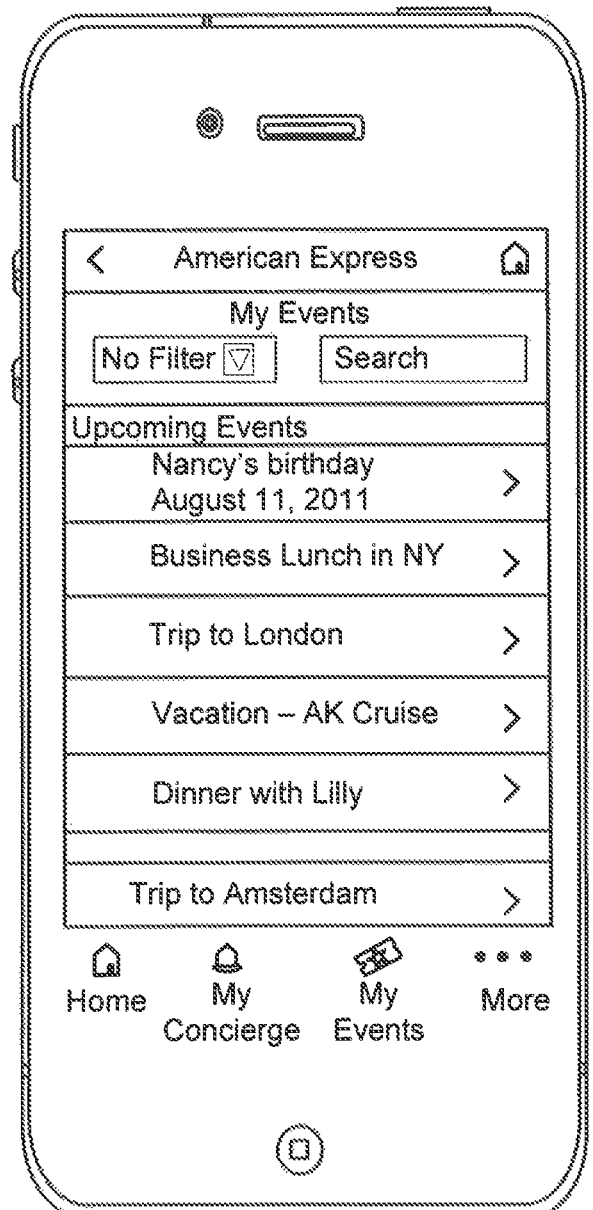
FIG. 9A shows a screenshot depicting an exemplary application based service dialog.

To illustrate further, an SDE may determine, based upon an event, such as a calendared event like a reminder, that the birthday of the spouse of the consumer is approaching (see FIG. 9A). Thus, an SDE may, for example, display a reminder to the consumer indicating that the birthday of the consumer's spouse is upcoming. In various embodiments, the consumer may be presented with an option to receive and/or review tailored content for the birthday of the consumer's spouse. However, in various embodiments, the consumer may not be presented with such an option; rather, an SDE may simply identify and/or deliver tailored content, as described herein, to the consumer based upon the determination. Accordingly, in various embodiments, an SDE may identify tailored content (e.g., a show or a concert, a restaurant, an event, etc.) in response to making a determination that an event is coming up, e.g., that a consumer's spouse's birthday is near (step 604).

Tailored content may be identified, as described herein, based upon a comparison of a consumer profile to content. Moreover, in various embodiments (e.g., where an event or reminder concerns an individual other than the consumer, and/or where a consumer is associated with a social network including, for example, children or a spouse of the consumer), tailored content may be identified based upon a consumer profile of the consumer and/or a consumer profile of the individual other than the consumer (e.g., the consumer's children and/or spouse). Thus, with respect to the foregoing example, where a consumer profile of the consumer indicates that the consumer likes Italian food but a consumer profile of the spouse indicates that the spouse prefers seafood, an SDE may not identify tailored content related to dining. Rather, where for example, both of the consumer profiles of the consumer and the consumer's spouse both include a preference for opera, an SDE may identify tailored content related to the opera. Having identified tailored content, an SDE may, as described herein, transmit the tailored content (e.g., via web client 302 and/or an application associated with web client 302) to the consumer (step 606).

Figure 9B:
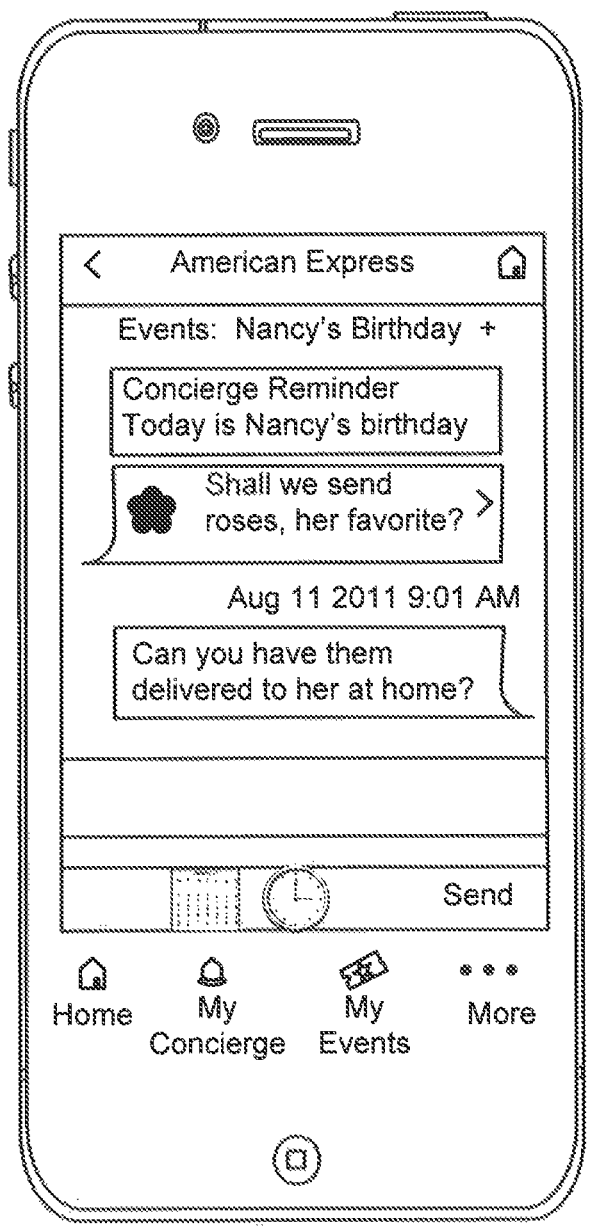
FIG. 9B shows a screenshot depicting an exemplary application based service dialog.
Figure 9C:
FIG. 9C shows a screenshot depicting an exemplary application based service dialog.

Moreover, in various embodiments, an SDE may initiate a message based service dialog, as described herein, in which the SDE reminds the consumer that a particular event may be upcoming (e.g., based upon a calendar of the consumer and/or a consumer profile) (step 606 and/or FIG. 9B). This may occur during an application based service dialog. For example, where an SDE determines that a consumer's spouse's birthday is upcoming, as described above, the SDE may initiate a message based service dialog to remind the consumer about the upcoming birthday and/or to inquire whether the consumer would like to purchase, for example, a birthday gift or flowers for his spouse, whether the consumer would like to hire a babysitter, and the like. Thus, an application based service dialog may include and/or transition into a message based service dialog, as described herein.

Whether a consumer engages in a message based service dialog (e.g., receives a message based reminder) and/or an application based service dialog (e.g., receives an application based reminder), a consumer may, as described herein, select tailored content in which the consumer is interested, and the SDE may receive the consumer's selection (step 608). Thus, with regard to the foregoing example, a consumer may select an option to purchase opera tickets for his spouse's birthday and/or to purchase flowers for his spouse's birthday. An SDE may further, as described herein, reserve a selected option and/or facilitate a purchase transaction associated with and/or payment for a selected option.

Moreover, as described herein, an SDE may transmit a confirmation to a consumer, which may or may not include detail regarding confirmation (step 610). Similarly, as described herein, tailored content transmitted to a consumer may include additional data as well. Thus, for example, where a consumer receives and/or selects an option to purchase opera tickets, the option may include a link to a ticketing website, with which the consumer may review detail about the opera, review and/or select seats for the opera, and the like (see FIG. 9C). Thus, in various embodiments, a service dialog may function as a tool to assist a consumer with specific details related to tailored content.

Referring now to FIGS. 7, 10A, 10B, and 10C, a process 700 and screenshots 1000A, 1000B, and 1000C are shown for identifying and/or delivering tailored content based upon a magazine based service dialog. In various embodiments, as used herein, a "magazine" may refer to any content that is presented electronically and/or capable of being presented electronically. For example, a magazine may comprise a website, a uniform resource locator ("URL"), a document (e.g., a MICROSOFT® Word document, a MICROSOFT® Excel document, an ADOBE® .pdf document, etc.), an "ebook," an "emagazine," an application or micro-application (as described herein), a text message, an email, and the like. Thus, a magazine based service dialog may, in various embodiments, comprise a service dialog which takes place, in full or in part, via a magazine displayed by web client 302. Accordingly, as shown and as described herein with regard to other types of service dialogs, an SDE may identify and/or deliver tailored content to a consumer in response to a variety of criteria (e.g., a request by a consumer for tailored content, a location of the consumer, a time of day, an event, a consumer profile, etc.) (step 702).

Figure 10A:
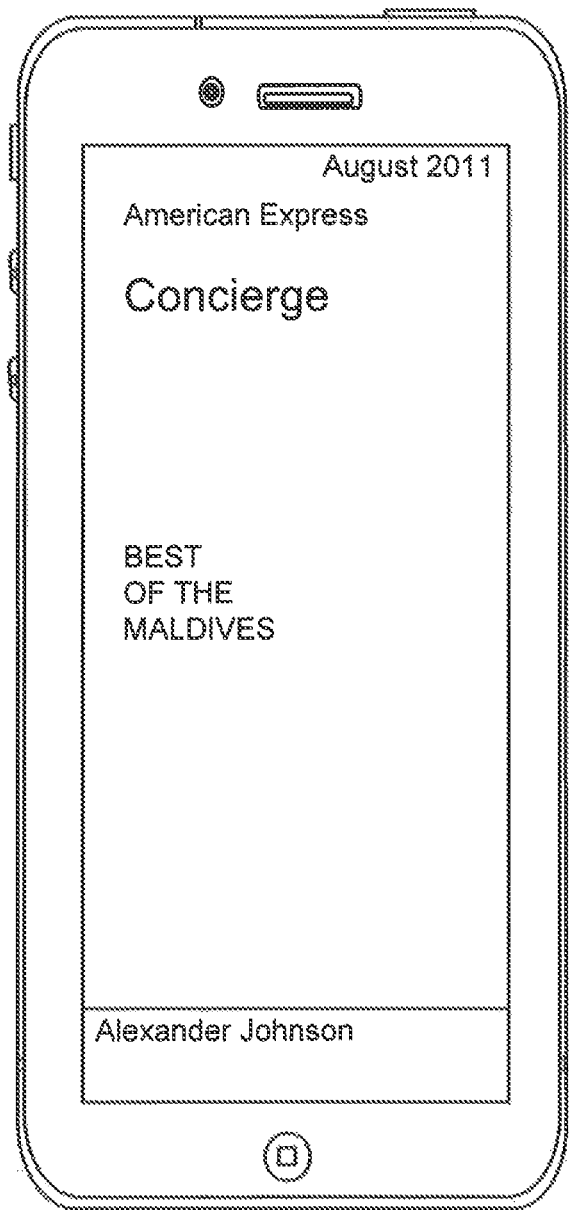
FIG. 10A shows a screenshot depicting an exemplary magazine based service dialog.
Figure 10B:
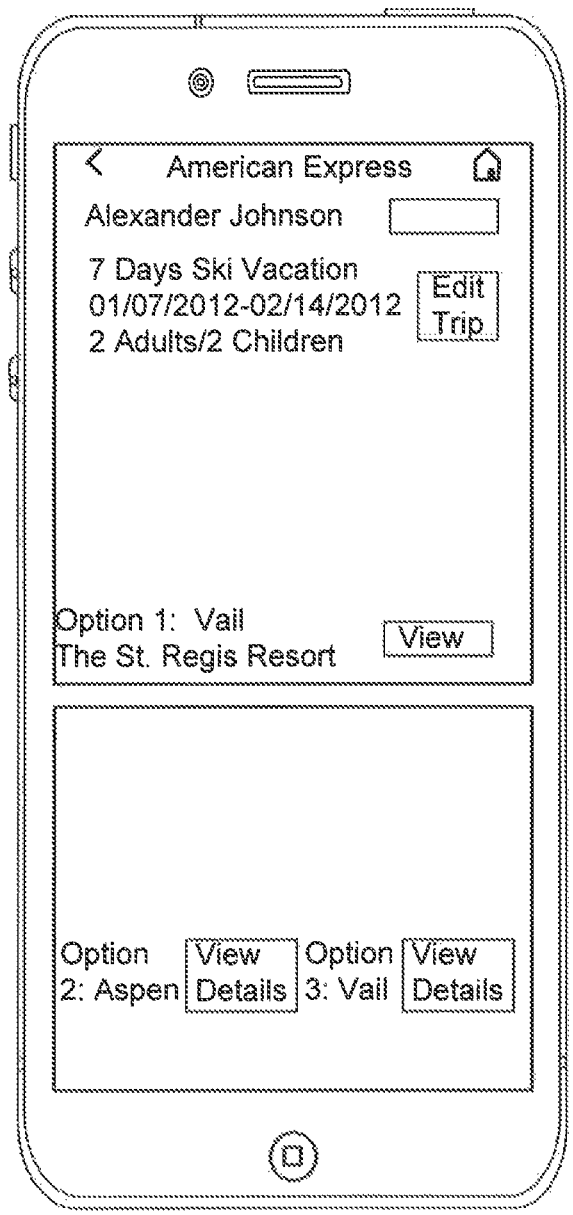
FIG. 10B shows a screenshot depicting an exemplary magazine based service dialog.
Figure 10C:
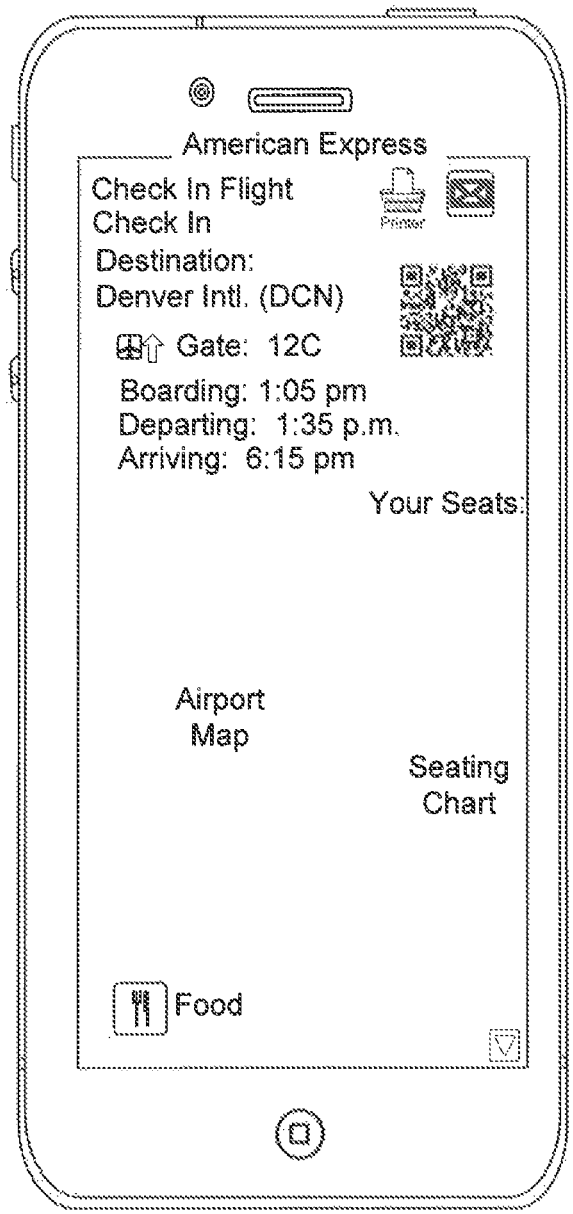
FIG. 10C shows a screenshot depicting an exemplary magazine based service dialog.

To illustrate, an SDE may identify tailored content, as described herein, based upon, for example, a consumer profile, which may include a preference and/or subpreference (as described herein) for travel, for example, related to skiing in Colorado during the month of January (see, e.g., FIG. 2) and/or a preference and/or subpreference for tropical vacations. The SDE may identify, based upon such a consumer profile, tailored content (such as an article or publication) related to a particular tropical location (e.g., as shown at FIG. 10A, the Maldives). A consumer may thus, via a magazine based service dialog, read and review tailored content (e.g., articles) which may be identified based upon a consumer profile.

Further, in various embodiments, an SDE may identify tailored options (e.g., based upon the consumer profile provided above) for vacations at a variety of ski resorts in Colorado during the month of January (e.g., Vail, Aspen, Breckenridge, etc.). Having identified these options, an SDE may transmit or deliver the options to a consumer (e.g., at the consumer's web client 302) (step 704, FIG. 10B). In addition, as described herein, an SDE and/or a consumer may initiate a message based service dialog with a consumer (i.e., during a magazine based service dialog), and this may occur, for example, in response to identification of tailored content and/or in response to a determination that a particular event (e.g., a consumer's spouse's birthday) is upcoming.

Further, in various embodiments, an SDE may transmit to a web client 302 displaying a magazine a variety of information associated with tailored content. For example, with respect to the tailored options discussed above (e.g., Vail, Aspen, Breckenridge), an SDE may include with the tailored content comprising these options descriptions of each option, reviews of each option, travel data associated with each option (e.g., flight data, rental car data, lodging data, the prices of lift tickets for each option, etc.) Thus, a magazine based service dialog may be advantageous in that a consumer may be presented with comprehensive information about tailored content. In various embodiments, application based service dialogs and message based service dialogs may include additional information, as discussed above, as well.

Having identified and/or delivered tailored content to a consumer, a consumer may, as described herein, select tailored content in which the consumer is interested, and the SDE may receive the consumer's selection (step 706). Thus, with regard to the foregoing example, a consumer may receive options (e.g., based upon a consumer profile) for vacations at a variety of ski resorts in Colorado during the month of January (e.g., Vail, Aspen, Breckenridge, etc.), but select an option to take a vacation to a particular ski resort in Colorado during the month of January (e.g., the Vail ski resort).

Continuing, in various embodiments and in response to a selection of a particular tailored option, for example, an SDE may transmit a confirmation (which may include additional information, such as a link, as described herein) to a consumer and/or facilitate a purchase transaction, as described herein, related to the option (step 708).

In various embodiments, as mentioned briefly above, an SDE may tailor or personalize a particular magazine (e.g., as described elsewhere herein) such that tailored content is displayed. For example, an SDE may tailor a magazine such that a magazine includes one or more sections or portions that are based upon the consumer profile. Thus, where a consumer profile shows that a consumer is interested in travel, a travel section of the magazine may be displayed for the consumer and/or specific tailored content (e.g, one or more articles or publications) may be displayed by a magazine. Moreover, content (e.g., sections, articles, etc.) that is typically unavailable to individuals who are not associated with consumer profiles may be displayed for a consumer who is associated with a consumer profile.

Further, in various embodiments, additional tailored content may be identified and/or delivered. For instance, a consumer may be shown a tailored article based upon a consumer profile and/or selection by the consumer of a tailored section of a magazine. Thus, as an example, a consumer may be shown a tailored article that gives a review of a new resort in a tropical region (e.g., the Maldives, as shown at FIG. 10A). As described herein, the tailored article may be identified by an SDE as relevant to the consumer based upon a consumer profile associated with consumer.

The consumer may review the tailored article, and, in various embodiments, the magazine may present a tailored offer based upon the consumer's review of the tailored article (and/or irrespective of the consumer's review of the tailored article, but based upon, for example, the consumer profile). For example, where the tailored article relates, as described above, to a resort in the Maldives, the consumer may be shown a tailored offer for a vacation package at the resort. The vacation package may include, to illustrate, a four night stay at the resort plus one night free at the resort (for a total of five nights), a discounted companion airfare from the Newark, N.J. airport, and an all day dining pass at the resort. The vacation package may include a five night stay, as described above, in response to data indicating that the consumer tends to stay at least five nights in any resort to which the consumer travels. Likewise, the vacation package may include an all day dining pass and airfare from Newark in response to data indicating that the consumer tends to travel with a family member or members for vacation trips, that the consumer has purchased dining packages as part of one or more previous trip purchases, that the consumer typically or often travels from the Newark, N.J. airport. Similarly, the vacation package may be for a stay in the Maldives, because the consumer's consumer profile indicates an interest in travel to such areas; and this indication may be based upon, as discussed herein, a consumer profile generated based upon data indicating that the consumer has discussed visiting the Bahamas on the consumer's Facebook® page, that the consumer typically or often takes vacations during the summertime, which is approaching, that the consumer appeared to be interested in the tailored article based upon the fact that the consumer lingered for several minutes on the tailored article (suggesting that the consumer read all or a portion of the tailored article), and/or the like.

Having received the tailored offer, the consumer may, in various embodiments, select an option to view more information about the offer, which may cause the magazine to show the consumer, for example, terms and conditions associated with the offer, detailed information about the offer, an option to book the vacation package associated with the offer, and the like (step 716). The consumer may, in addition, book the vacation package through the magazine and/or through a transaction account of the consumer, as described herein (step 718).

In various embodiments, a consumer profile and/or tailored content (e.g., a tailored option that a consumer has selected, as described herein) may be stored by way of the "cloud," as described above, and made available to a consumer across a variety of platforms. For example, in various embodiments, a consumer may initiate a message based service dialog but switch, during the dialog, to an application based service dialog and/or a magazine based service dialog. Where this occurs, an SDE may seamlessly reconnect the consumer with the service dialog which is in process, such that the consumer is not forced to initiate a new service dialog.

In various embodiments, an SDE may transmit tailored content to a consumer (e.g., tailored offers or options comprising offers, as described herein) from a variety of merchant systems 308. For example, an SDE may require or facilitate bidding between a variety of merchant systems 308, each of which may be associated with an offer of tailored content. For example, as described above, where a consumer is presented with several tailored options (e.g., options to purchase vacations in Vail, Aspen, and/or Breckenridge), an SDE may require each merchant system 308 to place a bid in association with the tailored option. Thus, merchants may be motivated to offer price reductions and/or upgraded deals, etc. during a bidding process. Moreover, in various embodiments, an SDE may transmit, organize, or filter selected tailored content based on a particular criterion and/or set of criteria, e.g., based on a price associated with the tailored content. For instance, where tailored content comprises an option or offer, as described, a variety of merchant systems 308 may wish to make a consumer an offer for a same, similar, or related item, in which case an SDE may filter or organize tailored options based upon a lowest price or a lowest set of prices. Further, an SDE may accept bids from merchant systems 306 for a specified bidding period, in response to which a lowest bid or group of bids may be transmitted to a consumer.

In various embodiments, a plurality of service dialogs may be prioritized. For example, in various embodiments, a plurality of service dialog requests may be prioritized based upon the tailored content with which they are associated. More particularly, a service dialog request may be prioritized as relatively urgent (meaning that an SDE should act quickly on the service dialog request) where, for example, the service dialog request is related to an item, such as a request for a restaurant, as described herein, which cannot or should not be delayed (e.g., because the consumer engaged in the service dialog request is presumably waiting for a list of tailored options in order to make a dining decision). On the other hand, where a service dialog request relates to an item, such as a vacation, as described herein, which may be delayed, an SDE may prioritize the service dialog request as not urgent or as less sensitive to delay. Thus, in other words, a service dialog request related to an item that will occur prior to an item associated with a service dialog request that will occur later may be prioritized over (e.g., as more important or more urgent) the later occurring service dialog request. Accordingly, in various embodiments, an SDE may handle service dialog requests based upon a priority associated with each service dialog request in a service dialog queue (e.g., an SDE may handle a service dialog request related to dining within a threshold amount of time, such as, five, ten, or fifteen minutes, while the SDE may handle a service dialog request related to a vacation within a larger threshold amount of time, such as one day).

As described herein, a consumer may wish to make a purchase based upon tailored content. In various embodiments, an SDE may communicate a payment option (e.g., an interface option, such as a "button" or another selectable option) to a web client 302 for selection by a consumer. A consumer may, as described herein, select a payment option in order to purchase an item related to tailored content delivered to the consumer as a result of (any type of) a service dialog. In various embodiments, an SDE may facilitate and/or process a transaction (e.g., a purchase transaction) in response to selection of a payment option. For example, an SDE may process a transaction based upon a consumer's transaction account (which may be stored as part of a consumer profile and/or provided to an SDE by a consumer via the consumer's web client 302, etc.)

In various embodiments, a transaction may, more specifically, be processed according to a variety of options. For example, an SDE may facilitate a transaction. Where an SDE facilitates a transaction, a consumer's anonymity and security may be preserved, and/or a consumer may not be required to manually provide to merchant system 308 certain information. For example, an SDE may receive a transaction request from a consumer, and SDE may, in response, communicate the consumer's transaction account information (e.g., the consumer's transaction account number) to merchant system 308 for further processing. Similarly, an SDE may, in response to a transaction request, communicate directly with merchant system 308 to process the transaction request, such that merchant system 308 receives payment but is not provided the consumer's transaction account information. For example, an SDE may transmit a transaction request to merchant system 308, and merchant system 308 may, in response, communicate a reply (e.g., indicating that a requested item is in stock or available). In response, an SDE may remit payment to merchant system 308, whereupon merchant system 308 may ship or otherwise make available the purchased item to the consumer.

In various embodiments, an SDE may update a consumer profile based upon feedback and/or feedback data. In various embodiments, an SDE may receive feedback by way of any mechanism, as described above, in which the SDE generates a consumer profile. For example, in various embodiments, an SDE may receive feedback from merchant system 308, and/or an SDE may receive feedback as part of a consumer's transaction account history. For example, where tailored content is delivered to a consumer, an SDE may compare the consumer's transaction account history over the course of a particular period of time (e.g., the previous hour, day, month, etc.) to tailored content delivered to the consumer during the same time period. Where, for example, the consumer's transaction account history indicates that the consumer purchased an item associated with certain tailored content, an SDE may adjust the consumer's consumer profile (e.g., one or more preferences and/or subpreferences) such that the consumer profile is reinforced or associated with a stronger preference and/or subpreference for content associated with the item. Similarly, where a consumer's transaction account history indicates that a consumer did not purchase an item associated with certain tailored content, an SDE may adjust the consumer's consumer profile such that the consumer profile is not reinforced or associated with a lesser or reduced preference and/or subpreference for content associated with the item. An SDE may react in similar fashion to feedback received from merchant system 308, except that, for example, merchant system 308 may, in various embodiments, provide feedback as to which tailored content a consumer clicked on or selected ("clickthrough data"). An SDE may process clickthrough data, as described with reference to transaction history information, to increase or decrease a consumer's preference and/or subpreference for content associated with a particular item. Thus, over time, an SDE may "learn" about and/or refine a consumer's preferences and/or subpreferences based upon feedback received in relation to the consumer's purchasing activity, browsing activity, and/or the like.

In various embodiments, an SDE may calculate or measure an effectiveness associated with tailored content (e.g, an effectiveness of an offer or advertisement). For example, an SDE may calculate an effectiveness of tailored content based upon a comparison of a consumer's purchasing activity to the tailored content that was distributed to the consumer. For example, tailored content may be regarded as effective or effectively tailored where a comparison of the tailored content to a consumer's transaction history shows that the consumer was exposed to the tailored content and soon thereafter or later purchased an item related to the tailored content. Moreover, in various embodiments, an SDE may evaluate a consumer's transaction history to ascertain a purchase objective associated with the consumer (e.g., business, pleasure, luxury, necessity, gift, and the like).

Moreover, in various embodiments, an SDE may calculate or measure an effectiveness and/or a business impact associated with a service dialog system 306 by collecting a brand equity metric comprising at least one of: a number of downloads associated with an application for facilitating a service dialog, a promoter score of the service dialog system 306, a feedback associated with the service dialog system 306, a number of rewards points awarded to a consumer, social media metrics such as re-tweets, clicks, check-ins, a number of merchant partners, a number of pre-sale offers by merchants, a number of rewards points per consumer (e.g., Platinum member), an market share, and the like. In various embodiments, an SDE may further calculate or measure an effectiveness of a service dialog system 306 by collecting a revenue metric comprising at least one of: a number of service dialog requests associated with a consumer, a number of service dialog requests that are fulfilled by an SDE, an amount purchased per service dialog request, an average and total number of card purchases per consumer and/or an average purchase price per consumer, a number of consumers participating in a service dialog system, a tenure of membership associated with consumers participating in a service dialog system, a cost associated with the an SDE (e.g., a cost per consumer, a cost per service dialog agent, an acquisition cost of new consumers, and the like). Continuing, in various embodiments, an SDE may further calculate or measure an effectiveness of a service dialog system 306 by analyzing at least one of: the brand equity metric and the revenue metric to demonstrate a business impact associated with the service dialog system 306.

In various embodiments, an SDE may enable and/or facilitate social networking between consumers. In various embodiments, consumers may be linked as members of a same social network by SDE. For example, a first consumer and a second consumer may specify and/or agree that they are members of a same or similar social network (e.g., a first consumer may send a second consumer a request to join the first consumer's social network, which the second consumer may accept).

Moreover, in various embodiments, an SDE may permit a consumer who has received tailored content to share the tailored content with another consumer (e.g., a consumer associated with a consumer profile, hereinafter referred to, for simplicity, as a "receiving consumer"). For example, in various embodiments, a consumer may receive a tailored option in response to a selection of such an option (e.g., a consumer may receive a confirmation of tickets to an opera performance, as described above), which the consumer may forward to another consumer associated with the SDE (e.g., through a consumer profile), such as, for example, the consumer's spouse. The receiving consumer may review tailored content, as described herein, via a web client 302 (e.g., via a magazine or magazine based service dialog).

Thus, with system 300, consumers may receive tailored content by way of a service dialog and based upon a variety of criteria, including, for example, a consumer profile. Where consumers wish to make purchases from one or more merchants, system 300 may reduce or eliminate the process of manual data entry typically required (e.g., consumers may not be required to enter shipping and/or billing information, transaction account information, and the like). System 300 may further safeguard consumer privacy during a purchasing process by processing a transaction request such that a merchant system 308 is not provided PII such as, for example, consumer transaction account information.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT, WINDOWS® 95/98/2000, WINDOWS® XP, WINDOWS® Vista, WINDOWS® 7, OS2, UNIX, Linux, Solaris, MacOS, etc.) as well as various conventional support software and drivers typically associated with computers. A user may include any individual, business, entity, government organization, software and/or hardware that interact with a system.

In various embodiments, various components, modules, and/or engines of system 100 may be implemented as micro-applications or micro-apps. Micro-apps are typically deployed in the context of a mobile operating system, including for example, a PALM® mobile operating system, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from ORACLE® Corporation (Redwood Shores, Calif.), MICROSOFT® Access or MICROSOFT® SQL Server by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other sub sets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVER® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a My SQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WWEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

With further regard to terms such as "consumer," "customer," "merchant," and the like, each of these participants may be equipped with a computing device in order to interact with the system and facilitate online commerce transactions. A consumer or customer may have a computing unit in the form of a personal computer, although other types of computing units may be used including laptops, notebooks, hand held computers, set-top boxes, cellular telephones, touch-tone telephones and the like. A merchant may have a computing unit implemented in the form of a computer-server, although other implementations are contemplated by the system. A bank may have a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein A merchant computer and/or a bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

An electronic commerce system may be implemented at the customer and issuing bank. In an exemplary implementation, the electronic commerce system may be implemented as computer software modules loaded onto the customer computer and the banking computing center. The merchant computer may not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

The phrases consumer, customer, user, account holder, cardmember or the like shall include any person, group, entity, business, organization, business, software, hardware, machine and/or combination of these, and may, in various embodiments, be associated with a transaction account, buy merchant offerings offered by one or more merchants using the account and/or be legally designated for performing transactions on the account, regardless of whether a physical card is associated with the account. For example, a consumer may include a transaction account owner, a transaction account user, an account affiliate, a child account user, a subsidiary account user, a beneficiary of an account, a custodian of an account, and/or any other person or entity affiliated or associated with a transaction account.

For instance, in various embodiments, a "consumer" may comprise any individual who interfaces with a service dialog system, as described herein. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like. In various embodiments, a merchant may request payment for goods sold to a customer or consumer who holds an account with a transaction account issuer.

As used herein, terms such as "transmit," "communicate" and/or "deliver" may include sending electronic data from one system component to another over a network connection. Additionally, as used herein, "data" may include encompassing information such as commands, queries, files, data for storage, and the like in digital or any other form.

Phrases and terms similar to "item" may include any good, service, information, experience, activity, data, content, access, rental, lease, contribution, account, credit, debit, benefit, right, reward, points, coupons, credits, monetary equivalent, anything of value, something of minimal or no value, monetary value, non-monetary value and/or the like.

Phrases and terms similar to "account," "transaction account," "account," "account number," "account code," and/or "consumer account" may include any account that may be used to facilitate a financial transaction. These accounts may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

As used herein, "content" may comprise any data and/or information. Content may comprise one or more items and/or data associated with one or more items, as discussed elsewhere herein. Content may further comprise one or more characteristics or metadata. The characteristics or metadata associated with content may describe one or more attributes associated with the content.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "internal data" or "closed loop data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claims is:

1. A method, comprising:
   identifying, by a computer-based system, tailored content based upon a reminder associated with a consumer; wherein the tailored content comprises a plurality of tailored options; identifying, by the computer-based system, consumer preferences for the consumer, wherein the consumer preferences are ranked based on spending amount, a weighting factor, a highest percentage of spending and frequency of a behavior;
   associating, by the computer-based system, a website with the tailored content by embedding the tailored content with at least one of a hyperlink or a uniform resource locator (URL), the at least one of a hyperlink or URL configured to cause retrieval, by a browser, of a website associated with the tailored content; and
   communicating, by the computer-based system and to a web client, the tailored content with tailored options related to the reminder.

2. The method of claim 1, wherein the receiving the selection of the tailored options is via an SMS message over an SMS communication channel.

3. The method of claim 1, further comprising setting, by the computer-based system, the reminder associated with the occurrence of the selection.

4. The method of claim 1, wherein the tailored options enable the consumer to conduct transactions directly with a merchant.

5. The method of claim 1, wherein the identifying the tailored content is further based upon consumer preferences in a consumer profile and information from a custom service dialog.

6. The method of claim 1, further comprising receiving, by the computer-based system, a selection of the tailored options.

7. The method of claim 1, wherein the identifying the tailored content is further based upon information from a custom service dialog, wherein the custom service dialog is via at least one of an SMS message over an SMS communication channel, an application based service dialog over a web client or a magazine based service dialog.

8. The method of claim 1, wherein the identifying the tailored content is further based upon information from a custom service dialog, wherein the custom service dialog includes providing custom questions focused on obtaining more information about the custom request.

9. The method of claim 1, wherein the plurality of tailored options include merchant data related to advertising and offers.

10. The method of claim 1, further comprising analyzing, by the computer-based system, a consumer profile to determine the consumer preferences, wherein at least a portion of data in the consumer profile is obtained from a transaction processing system.

11. The method of claim 1, further comprising analyzing, by the computer-based system, a spouse profile to determine the consumer preferences, wherein the spouse profile is a profile of a spouse of the consumer associated with the consumer profile.

12. The method of claim 1, further comprising performing, by the computer-based system and in response to the reminder, a custom service dialog to obtain information related to a custom request associated with the reminder.

13. The method of claim 1, wherein the tailored content is determined based upon at least one of a consumer pattern or content metadata.

14. The method of claim 1, wherein the tailored content is determined based upon content metadata, and wherein the content metadata includes category data associated with the tailored content.

15. The method of claim 1, wherein the weighting factor is impacted by at least one of a selection by the consumer of the tailored content, a transaction history associated with the consumer or a browsing history associated with the consumer.

16. The method of claim 1, further comprising processing, by the computer-based system, a payment in association with the tailored content in response to the receiving the selection.

17. The method of claim 1, further comprising processing, by the computer-based system, a payment, wherein the processing the payment includes transmitting a payment option to the web client, wherein the payment option includes a selectable interface button, wherein selection of the payment option causes a transaction request to be sent from the computer based system to a merchant system.

18. An article of manufacture including a non-transitory, tangible computer readable storage medium having instructions stored thereon that, in response to execution by a computer-based system, cause the computer-based system to perform operations comprising:
   identifying, by the computer-based system, tailored content based upon a reminder associated with a consumer;
      wherein the tailored content comprises a plurality of tailored options; identifying, by the computer-based system, consumer preferences for the consumer,
      wherein the consumer preferences are ranked based on spending amount, a weighting factor, a highest percentage of spending and frequency of a behavior;
   associating, by the computer-based system, a website with the tailored content by embedding the tailored content with at least one of a hyperlink or a uniform resource locator (URL), the at least one of a hyperlink or URL configured to cause retrieval, by a browser, of a website associated with the tailored content; and
   communicating, by the computer-based system and to a web client, the tailored content with tailored options related to the reminder.

19. A system comprising:
   a processor,
   a tangible, non-transitory memory configured to communicate with the processor,
   the tangible, non-transitory memory having instructions stored thereon that, in response to execution by the processor, cause the processor to perform operations comprising:
   identifying, by the processor, tailored content based upon a reminder associated with a consumer;
      wherein the tailored content comprises a plurality of tailored options; identifying, by the computer-based system, consumer preferences for the consumer,
      wherein the consumer preferences are ranked based on spending amount, a weighting factor, a highest percentage of spending and frequency of a behavior;
   associating, by the processor, a website with the tailored content by embedding the tailored content with at least one of a hyperlink or a uniform resource locator (URL), the at least one of a hyperlink or URL configured to cause retrieval, by a browser, of a website associated with the tailored content; and
   communicating, by the processor and to a web client, the tailored content with tailored options related to the reminder.

* * * * *